United States Patent [19]

Gilfeather et al.

[11] Patent Number: 4,992,930
[45] Date of Patent: Feb. 12, 1991

[54] SYNCHRONOUS CACHE MEMORY SYSTEM INCORPORATING TIE-BREAKER APPARATUS FOR MAINTAINING CACHE COHERENCY USING A DUPLICATE DIRECTORY

[75] Inventors: Amy E. Gilfeather, Charlestown; George J. Barlow, Tewksbury, both of Mass.

[73] Assignee: Bull HN Information Systems Inc., Billerica, Mass.

[21] Appl. No.: 191,319

[22] Filed: May 9, 1988

[51] Int. Cl.⁵ .............................................. G06F 13/14
[52] U.S. Cl. ................................. 364/200; 364/243.41; 364/243.45
[58] Field of Search ... 364/200 MS File, 900 MS File; 371/10.1, 11.1

[56] References Cited

U.S. PATENT DOCUMENTS

| | | | |
|---|---|---|---|
| 4,392,200 | 7/1983 | Arulpragasam et al. | 364/200 |
| 4,471,429 | 9/1984 | Porter et al. | 364/200 |
| 4,731,739 | 3/1988 | Woffinden et al. | 364/200 |
| 4,807,110 | 2/1989 | Pomerene et al. | 364/200 |

Primary Examiner—Michael R. Fleming
Assistant Examiner—Debra A. Chun
Attorney, Agent, or Firm—Faith F. Driscoll; John S. Solakian

[57] ABSTRACT

A multiprocessor data processing system includes a processing unit which, together with other processing units, including input/output units, connects in common to an asynchronous bus network for sharing a main memory. At least one processing unit includes a synchronous private write through cache memory system which includes a main directory and data store in addition to a bus watcher and a duplicate directory. The bus watcher connects to the asynchronous bus network and captures all main memory requests while the duplicate directory maintains a copy of the cache unit's main directory. Independently and autonomously synchronously operated tie-breaker circuits apply requests to the main and duplicate directories. When tie-breaker circuits detect conditions relating to a request which could result in cache incoherency, it initiates uninterrupted sequences of cycles within the corresponding cache main or duplicate directory to complete the processing of that same request.

35 Claims, 13 Drawing Sheets

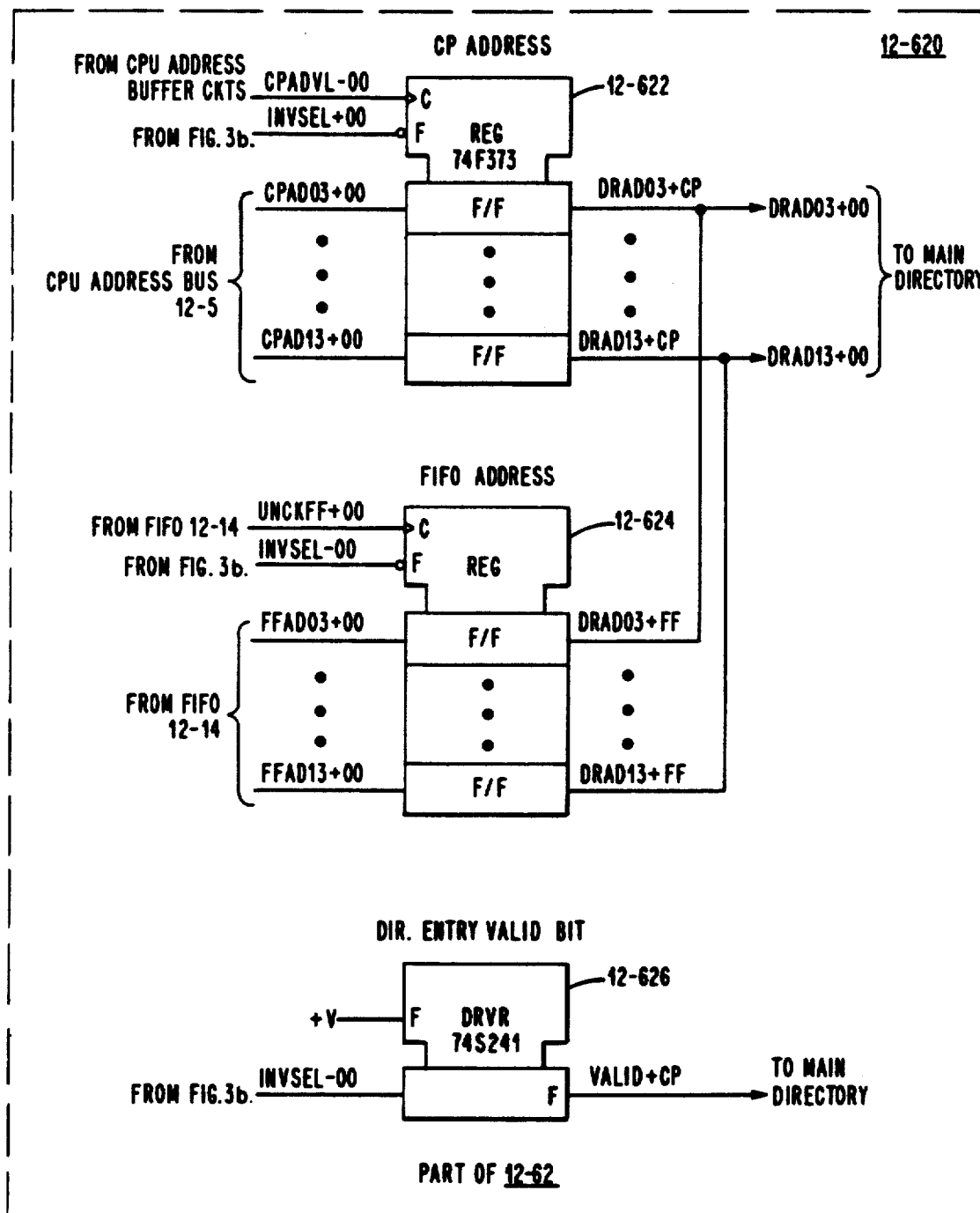
Fig. 3c. (sheet 1 of 2)

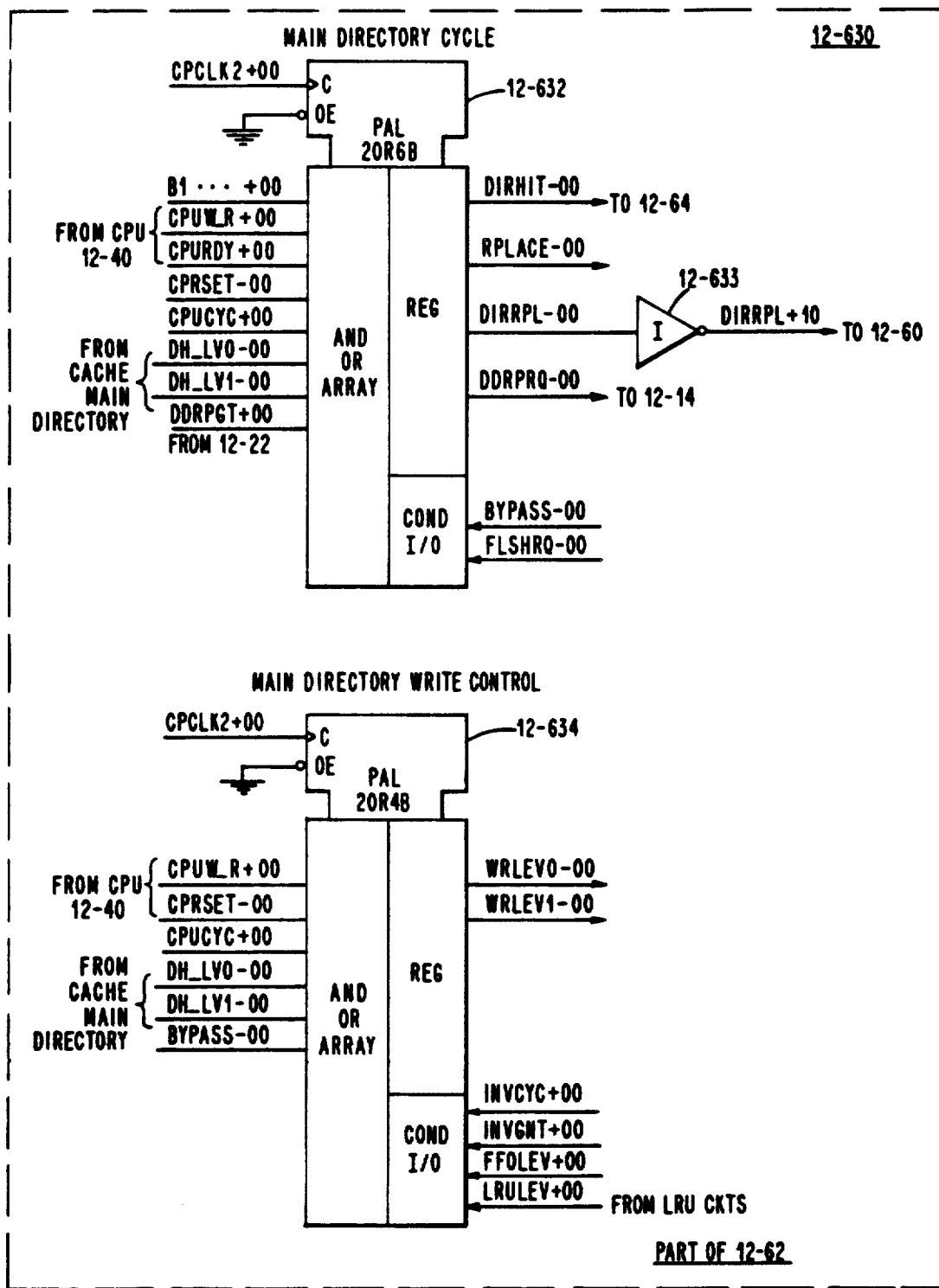
Fig. 3c. (sheet 2 of 2)

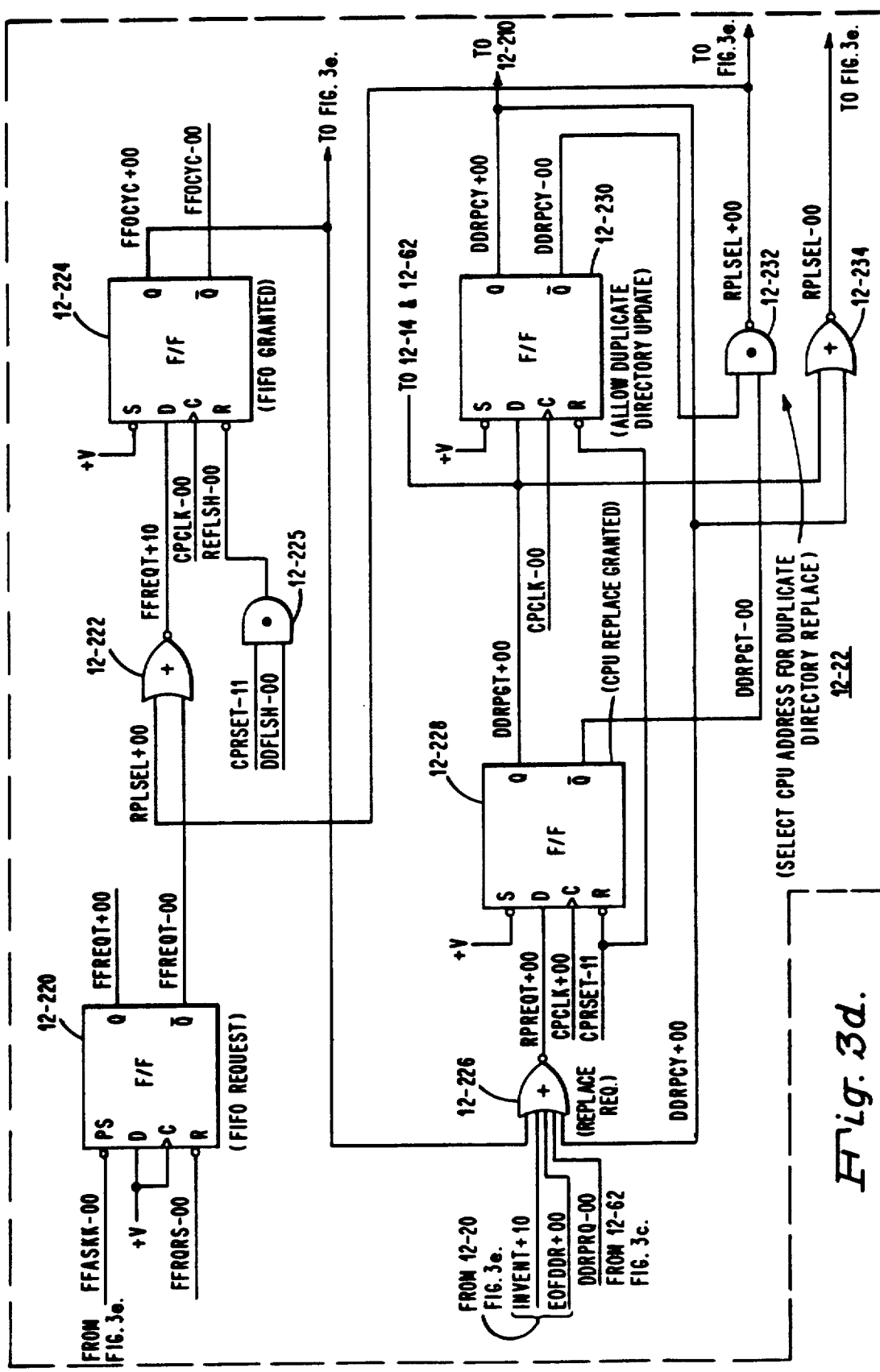

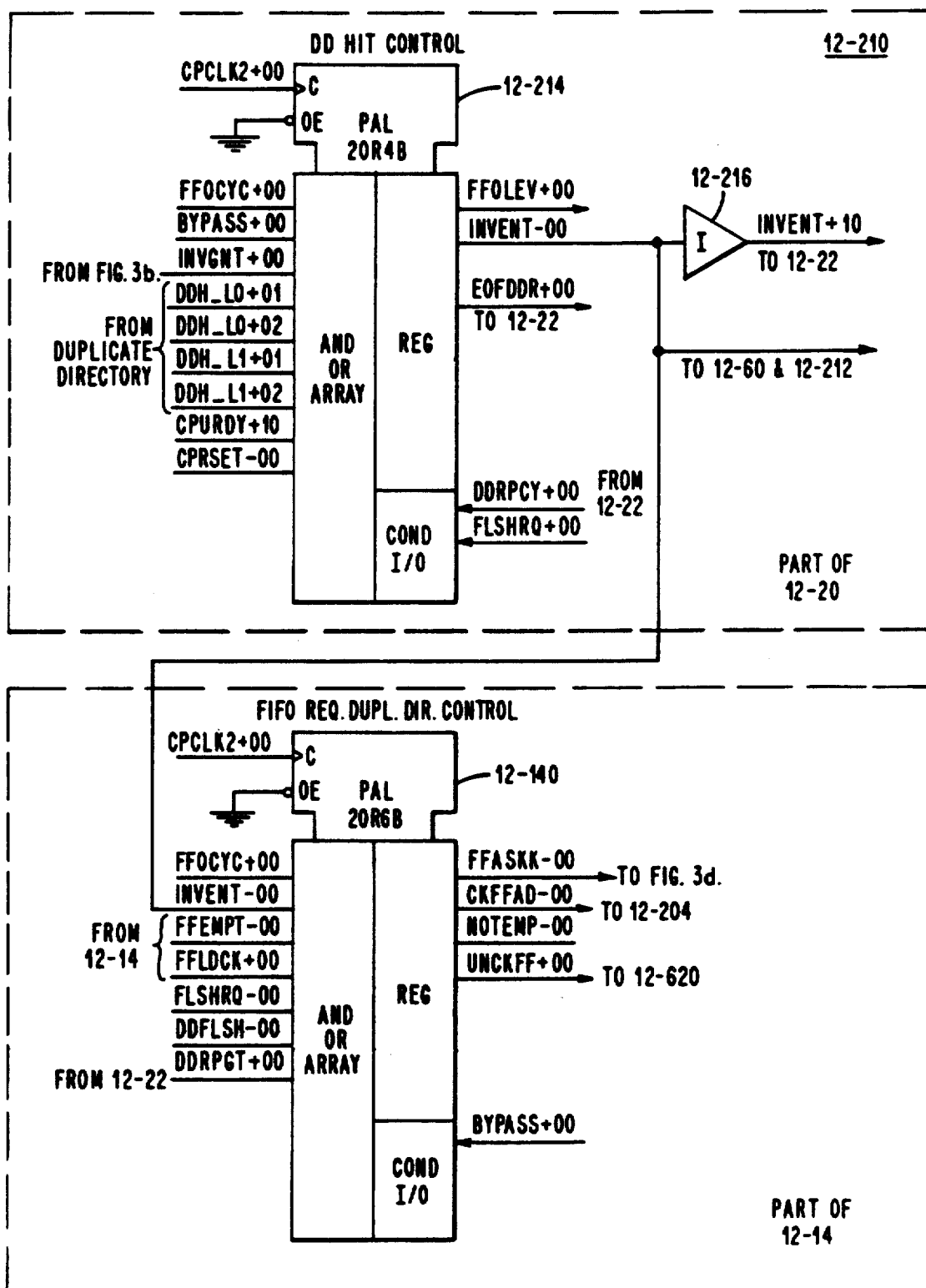
Fig. 3e. (sheet 2 of 2)

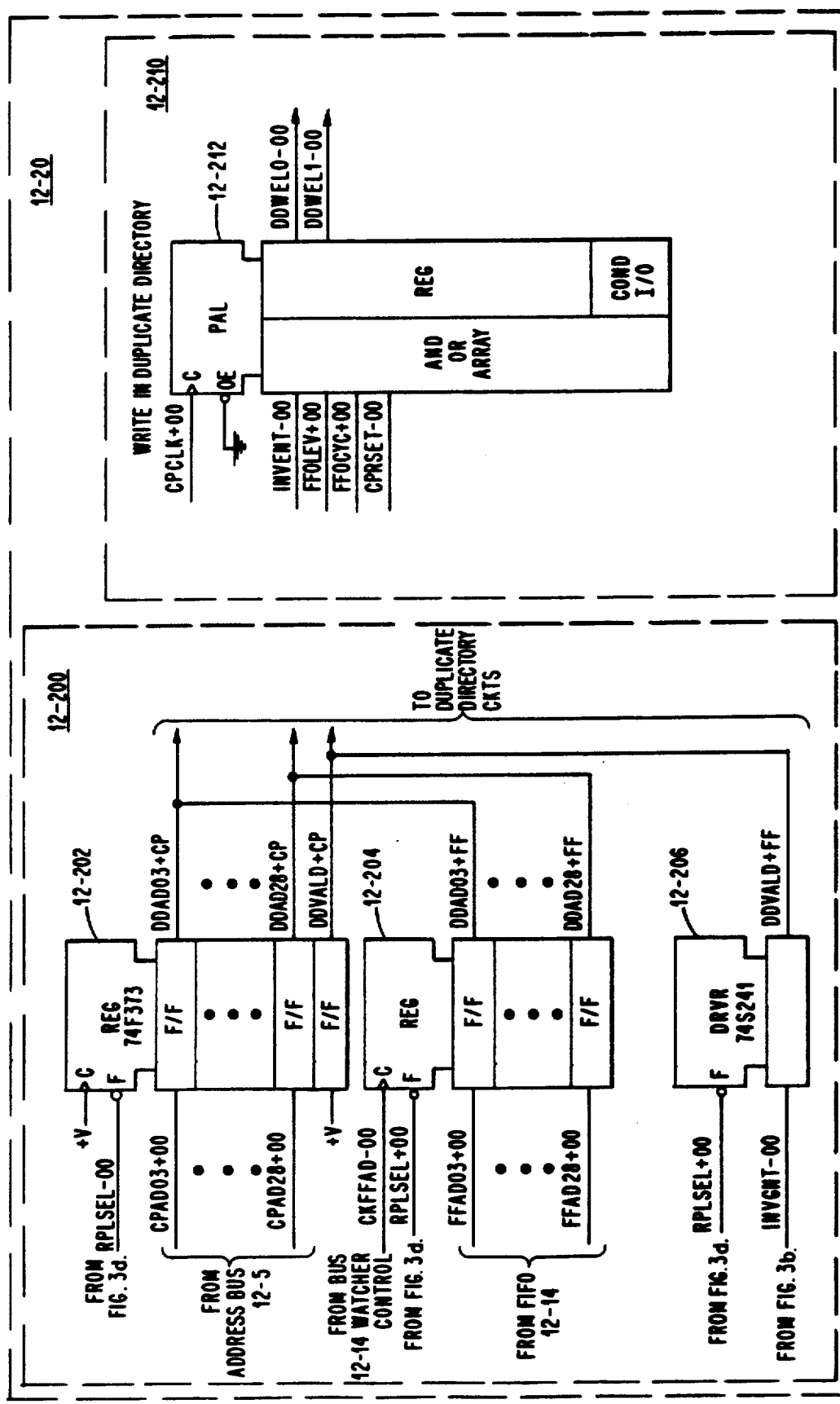
Fig. 3a. (sheet 1 of 2)

DUPLICATE DIRECTORY ACCESS OPERATION

MISS DURING FIFO COMPARE CYCLE

|  | CYCLE 1 | CYCLE 2 | CYCLE 3 | CYCLE 4 |
|---|---|---|---|---|
| DUPLICATE DIRECTORY CYCLE ASSIGNMENT |  | FIFO | CP |  |
| FIFO REQUEST PROCESSING | REQUEST RECEIVED | COMPARE CYCLE | N/A MISS |  |
| CP REQUEST PROCESSING | REQUEST RECEIVED | INHIBIT CP REQ. ACCESS | ALLOCATE DIRECTORY |  |

*Fig. 4a.*

DUPLICATE DIRECTORY ACCESS OPERATION

HIT DURING FIFO COMPARE CYCLE

|  | CYCLE 1 | CYCLE 2 | CYCLE 3 | CYCLE 4 |
|---|---|---|---|---|
| DUPLICATE DIRECTORY CYCLE ASSIGNMENT |  | FIFO | FIFO | CP |
| FIFO REQUEST PROCESSING | REQUEST RECEIVED | COMPARE CYCLE | INVALIDATE DIRECTORY |  |
| CP REQUEST PROCESSING | REQUEST RECEIVED | INHIBIT CP REQ. ACCESS | INHIBIT CP REQ. ACCESS | ALLOCATE DIRECTORY |

UNINTERRUPTED FIFO SEQUENCE (Cycles 2–3)

*Fig. 4b.*

MAIN DIRECTORY ACCESS OPERATION

HIT DURING CP COMPARE CYCLE

|  | CYCLE 1 | CYCLE 2 | CYCLE 3 | CYCLE 4 |
|---|---|---|---|---|
| MAIN DIRECTORY CYCLE ASSIGNMENT |  | CP | DUPL. DIR. |  |
| CP REQUEST PROCESSING | REQUEST RECEIVED | COMPARE CYCLE | N/A HIT |  |
| INV. REQUEST PROCESSING | REQUEST RECEIVED | INHIBIT INV. REQ. ACCESS | INVALIDATE DIRECTORY |  |

*Fig. 5a.*

MAIN DIRECTORY ACCESS OPERATION

MISS DURING CP COMPARE CYCLE

|  | CYCLE 1 | CYCLE 2 | CYCLE 3 | CYCLE 4 |
|---|---|---|---|---|
| MAIN DIRECTORY CYCLE ASSIGNMENT |  | CP | CP | DUPL. DIR. |
| CP REQUEST PROCESSING | REQUEST RECEIVED | COMPARE CYCLE | ALLOCATE DIRECTORY |  |
| INV. REQUEST PROCESSING | REQUEST RECEIVED | INHIBIT INV. REQ. ACCESS | INHIBIT INV. REQ. ACCESS | INVALIDATE DIRECTORY |

UNINTERRUPTED CP SEQUENCE (cycles 2–3)

*Fig. 5b.*

SYNCHRONOUS CACHE MEMORY SYSTEM INCORPORATING TIE-BREAKER APPARATUS FOR MAINTAINING CACHE COHERENCY USING A DUPLICATE DIRECTORY

RELATED PATENT APPLICATIONS

The following patent applications disclose a preferred embodiment of the system in which the cache memory of the present invention finds utilization.

1. The patent application of John L. Curley, Thomas S. Hirsch and David A. Wurz entitled, "Apparatus and Method for Alterable Resource Partitioning Enforcement in a Data Processing System Having Central Processing Units Using Different Operating Systems," filed on Dec. 21, 1987, bearing serial number 07/136,056, which is assigned to the same assignee as this patent application.
2. The patent application of John L. Curley, Thomas S. Hirsch, John C. Penney, Ileana S. Reisch, Theodore R. Staplin, Jr. and David A. Wurz entitled, "Apparatus Having a Peer Relationship Among a Plurality of Central Processing Units," filed on Dec. 21, 1987, bearing serial number 07/136,055, which is assigned to the same assignee as this patent application.
3. The patent application of John L. Curley, Thomas S. Hirsch, John C. Penney, Ileana S. Reisch, James M. Sandini, Theodore R. Staplin, Jr. and David A. Wurz entitled, "Apparatus and Method for Access to User Programs Controlled by a First Operating System by Users Interacting with a Data Processing System Through a Second Operating System," filed on Dec. 21, 1987, bearing serial number 07/136,058, which is assigned to the same assignee as this patent application.

BACKGROUND OF THE INVENTION

Field of Use

This invention relates to data processing systems and more particularly to processing systems which include a cache memory system.

Prior Art

Cache memories have been highly effective in increasing the throughput of small and large uniprocessor and multiprocessor systems. In multiprocessor systems, cache memories are normally configured in either of two ways. The first is a shared cache configuration in which a cache memory is utilized for one or several main memory modules and is accessible by all of the processors within the system. The second configuration is a private cache arrangement in which the cache memory is dedicated to a single processor. These configurations are described in an article titled, "Effects of Cache Coherency in Multiprocessors," by Michael Dubois and Fay A. Briggs, IEEE Transactions on Computers, Volume C-31, No. 11, November 1982.

In those multiprocessor systems which employ cache systems utilizing a "store into" technique, the data written into the cache memory by its associated processing unit is not returned to main memory. Hence, the latest form of the data resides in the processing unit's cache memory. To permit a processing unit to access the latest copy of a given block of data stored within another processing unit's cache memory, a duplicate directory is included within each processing unit along with associated circuits. U.S. Pat. No. 4,695,951, which is assigned to the same assignee as named herein, is an example of this type of system.

By contrast, in other types of multiprocessor systems which employ write through techniques, the data written into the cache memory by its associated processing unit is always written into main memory. Hence, the most recent version of the data resides in main memory. U.S. Pat. No. 4,392,200 is an example of this type of system.

The above system includes a duplicate directory to prevent the updating of a particular cache location that has yet to be updated by an external write that produces a hit in the cache memory which is shared by a plurality of processing units. Updating is prevented if the cache location has been reallocated to a different memory location during the time between the two passes of the external write through the resources of a pipelined common control unit. The duplicate directory is positioned at the entry of a memory return queue. This preserves the order of read and write entries so as to ensure that the cache memory is not erroneously updated. The duplicate directory and memory return queue are also used to establish the same type of ordering for updating the cache when the contents of main memory are changed as a result of I/O transactions taking place on an asynchronous bus to which main memory and a plurality of devices connect in common.

This arrangement presumes that the main memory will perform the read and write operations in the same order in which the commands are received from the units. However, in some systems, the main memory can be accessed during each cycle by different units. This improves the overall performance of the system since access by another unit need not be delayed until the memory data requested by a command has been returned to the requesting unit.

Thus, in this type of system, it is not possible to determine the order in which write and read entries will be received by the processing unit's cache system. Accordingly, cache incoherency would result in the above mentioned type of prior art system.

Because of the above cache coherency problems, the use of a duplicate directory, particularly in the case of private cache arrangements, has been avoided. The approach has been to update the processing unit's cache system directly through the use of a first in first out (FIFO) memory which is granted access to the cache memory via a local bus on a priority basis. This type of system is disclosed in U.S. Pat. No. 4,378,591. While the cache update operations are assigned a priority higher than the processing unit, this has been found to slow down the performance of the processing unit.

In systems where the I/O transactions do not involve or relate to main memory data which is being utilized by the processing unit, the cache update cycles which are performed do not affect coherency and, therefore, are needless and wasteful. Hence, this has resulted in decreases in performance.

Accordingly, it is a primary object to provide a high performance private cache system which connects to an asynchronous system bus in common with main memory and a plurality of I/O sources.

It is a further object of the present invention to provide a private cache system which reliably maintains data coherency for an associated data processing unit.

SUMMARY OF THE INVENTION

The above objects and advantages are achieved in a preferred embodiment of the present invention. The preferred embodiment of the invention is utilized in a multiprocessor data processing system which includes a processing unit whose operations are synchronized by an internal clock source and includes a private write through cache memory which includes a main directory and cache store. The processing unit further includes a bus watcher unit connected within the system to monitor and capture main memory requests generated on the system's asynchronous system bus network by a number of I/O units and other processing units which connect in common with a shared main memory unit.

According to the present invention, the data processing unit further includes a duplicate directory unit which maintains an identical copy of the cache memory directory contents. A first tie-breaker circuit is connected to apply requests from the bus watcher unit and processing unit to the duplicate directory circuit. A second tie-breaker circuit is connected to apply requests from the processing unit and duplicate directory to the main directory.

Clock signals from the clock source are applied to the bus watcher unit, the tie-breaker circuits and the cache directories and data store for synchronizing their operations relative to the receipt and processing of requests. Additionally, the clock source includes control circuits which generate a repetitive sequence of control signals representative of a corresponding number of sequential states. Out-of-phase clock signals are applied to each tie-breaker circuit so that simultaneously applied requests are automatically serialized.

When either tie-breaker circuit detects the occurrence of a condition relating to a request which could result in cache incoherency, it causes control circuits associated therewith to initiate an uninterrupted sequence or series of cycles within either the cache memory directory or duplicate directory to complete the processing of that same request. That is, in the case of a processing unit read request presented to the main directory, which coincides with an external write request, detecting that the data requested by the processing unit is not stored in cache's data store during a first cycle (i.e., a compare cycle), causes a second cycle (allocate cycle) to be performed within the main directory without interruption in response to the same read request. In the case of an external write request presented to the duplicate directory which coincides with a processing unit's cache request, detecting that the data being written externally is stored in the cache's data store during the first cycle (i.e., compare cycle) causes a second cycle (i.e., invalidate cycle) to be performed within the duplicate directory in response to the same external write request.

Except for those instances where the duplicate and main directories require access to each other, both the duplicate and main directories operate independently in servicing external write requests and cache requests from the bus watcher and the processing unit respectively. Since the directories and other parts of the processing unit operate in a completely synchronous state fashion, their operations can proceed independently and autonomously except in those situations which could produce cache incoherency.

The synchronous state operation prevents any event or request from causing cache incoherency. That is, the invention recognizes that the events which can result in cache incoherency occur in those situations where the directories are required to communicate with each other. That is, if an external write has taken place on the system bus involving data stored in the cache's data store, it is necessary that both directories be set to the correct state. For example, if the write through cache memory is processing a cache read request and finds the data is not stored in cache (i.e., gets a miss), it then becomes necessary to replace or allocate an entry or location in the cache main directory. If, at the same time, the bus watcher received an external write request indicating that a unit on the system bus wrote to the same address, it also becomes necessary to invalidate this address entry within the duplicate directory.

In the above case, the cache directory address entry would be invalidated in the cache directory and the location reallocated in response to the cache read request resulting in a valid entry. However, on the system bus side, the same location in the duplicate directory would be reallocated in response to the cache read request and then invalidated as a result of response to the external write specifying that location received from the system bus. This means that if other devices on the system bus write to that address, it will go undetected because that location was invalidated in the duplicate directory. However, the processing unit will continue to use the same location in cache.

The apparatus of the present invention prevents the occurrence of this type of incoherency by causing synchronous uninterrupted sequence of cycles to be performed which results in either the allocation or invalidation of locations within both directories. Thus, incoherency is prevented without having to halt or delay the operation of the processing unit. Also, at the same time, it enables concurrent independent synchronous operations to be carried out by the bus watcher unit and data processing unit at a high speed clock rate.

Thus, the invention enhances cache memory performance substantially, particularly in a system such as that of the preferred embodiment wherein most of the external writes are to addresses or locations which are not being used by the data processing unit. For example, in the system of the preferred embodiment, the processing unit functions as a coprocessor. A similar advantage will result in those types of systems which handle considerable I/O bus requests to memory which involve data unrelated to the jobs being executed by data processing units within the system or remote to the system.

In the preferred embodiment of the present invention, cache memory locations are preallocated. That is, entries in the cache store are allocated before the data is read from main memory. This eliminates the type of coherency problems which result from allocating cache locations only after the data is received from main memory.

In addition to the above, the synchronous state mode of operation of the write through cache memory of the present invention simplifies its construction by eliminating the use of delay circuits, as well as increasing its performance. That is, the associated data processing unit can operate with zero wait states. That is, there is no waiting for memory because the cache memory chips can provide/take the data to and from the data processing unit as fast as demanded. Also, this approach enhances reliability and facilitates testing and the diagnosis of faults.

The novel features which are believed to be characteristic of the invention, both as to its organization and method of operation, together with further objects and advantages, will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 3a through 3e show in greater detail, different sections of the cache memory unit of FIG. 2.

FIGS. 4a and 4b and FIGS. 5a and 5b are timing diagrams used to explain the operation of the cache memory unit of the present invention.

DESCRIPTION OF THE SYSTEM OF FIG. 1

Figure 1:
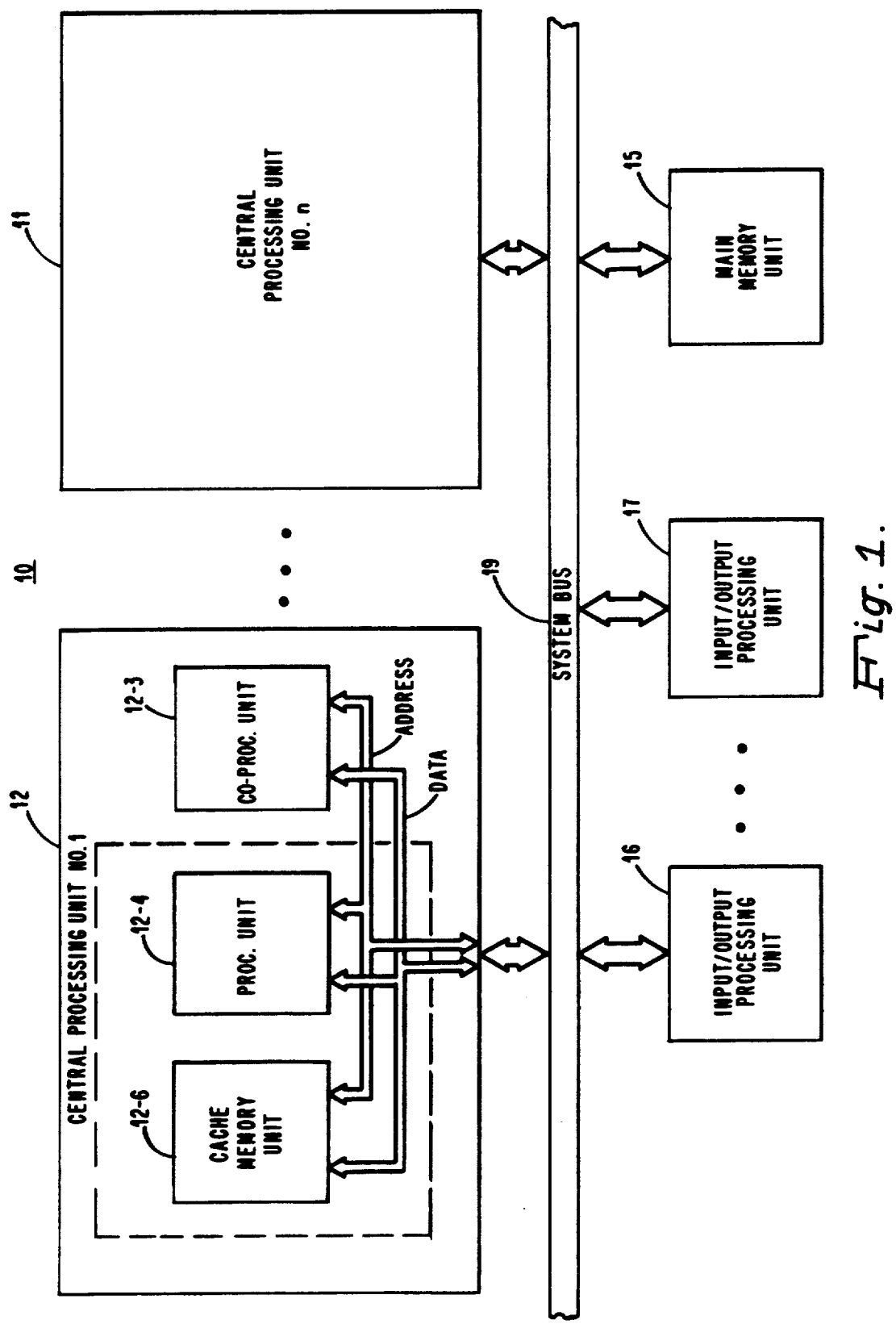
FIG. 1 is a block diagram of a data processing system which includes the cache memory unit of the present invention.

FIG. 1 shows a multiprocessor data processing system 10 which includes a plurality of central processing units 11 through 12 and input/output processing units 16 through 17 which couple in common to a system bus 19 and to a main memory unit 15. Each unit includes an interface area which enables the unit or unit associated therewith to transmit or receive requests in the form of commands, interrupts, data or responses/status to another unit on system bus 19 in an asynchronus manner. That is, each interface area can be assumed to include bus interface logic circuits such as those disclosed in U.S. Pat. No. 3,995,258 entitled, "Data Processing System Having a Data Integrity Technique," invented by George J. Barlow and U.S. Pat. No. 3,997,896 entitled, "Data Processing System Providing Split Bus Cycle Operation," invented by G. Bekampis, et al.

As discussed later herein, the system bus 19 is accessible on a split cycle basis which provides higher performance by granting other unit bus cycles during the period of time a unit is waiting for main memory to furnish data in response to an earlier request made by that unit. This type of operation is described in previously referred to U.S. Pat. No. 3,997,896.

Referring to FIG. 1, it is seen that the main components of a CPU 12 include a processing unit 12-1, a coprocessor unit 12-3 and a cache memory unit 12-4, all of which connect to system bus 19. The principal processing function is performed by the processing unit 12-1 which is constructed from an Intel 80386 chip component. The complex processing functions, such as floating point operations, are performed by coprocessor unit 12-3 which is constructed from an Intel 80387 chip component. Cache memory unit 12-4 provides access to the data required for processing by processing unit 12-1. In the preferred embodiment, CPU 12 operates under control of a UNIX operating system.

In FIG. 1, CPU 11 functions as a host processor which in the preferred embodiment is a Honeywell Bull DPS6 PLUS system which operates under the control of the Honeywell Bull HVS 1 operating system.

Thus, in the system of FIG. 1, CPU 11 and CPU 12 are organized to operate in an independent manner and have access to the full complement of system resources. Therefore, to a large extent, the I/O transactions or writes to main memory unit 15 will not involve data which is being utilized by CPU 12 in its operation. The present invention takes advantage of this factor in providing a high performance cache memory system.

CENTRAL PROCESSING UNIT 12

Figure 2:
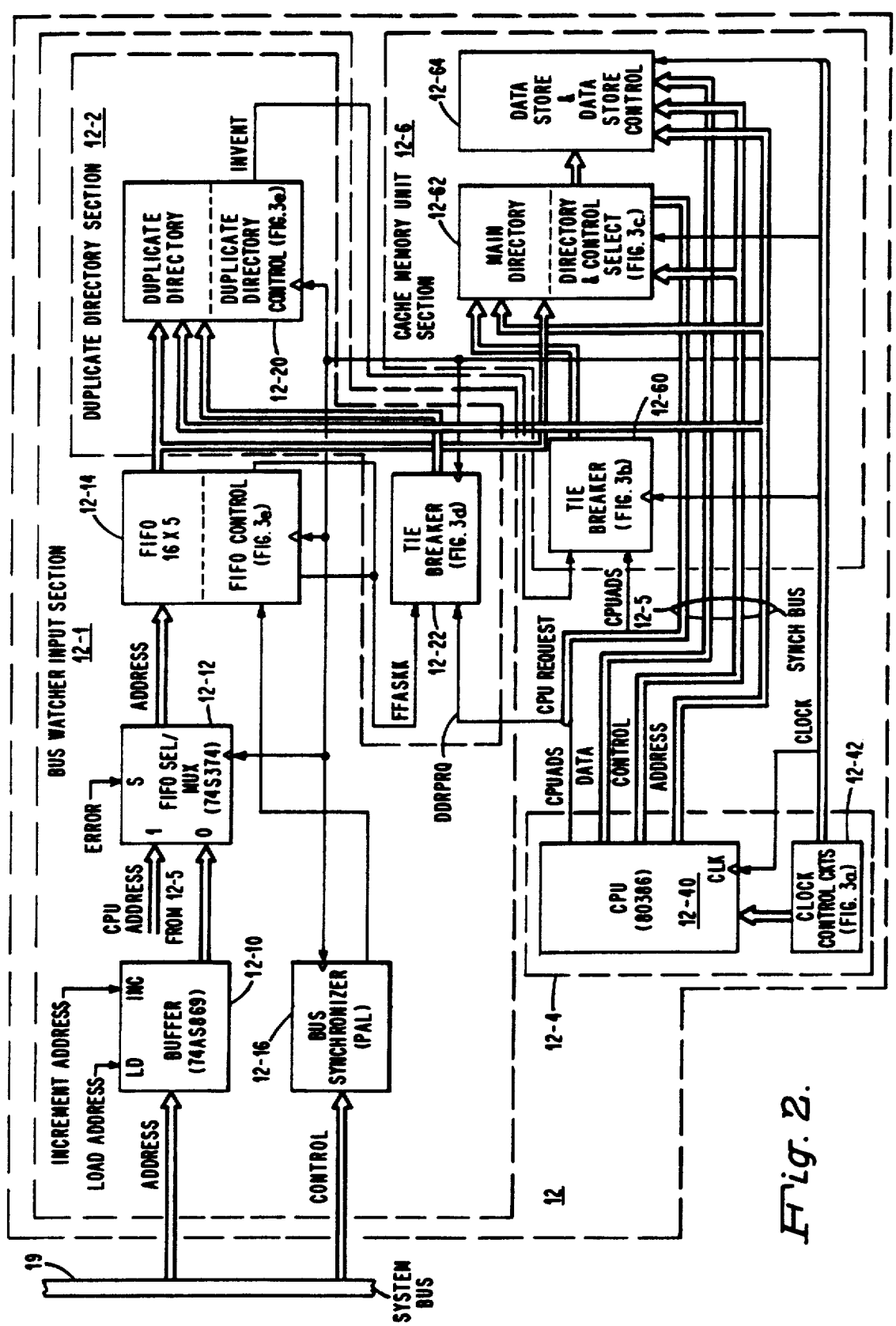
FIG. 2 is a block diagram of the cache memory unit of FIG. 1.

FIG. 2 shows in greater detail, processing unit 12-4 and cache memory unit 12-6. In addition to these units, CPU 12 further includes a bus watcher unit 12-1 and a duplicate directory 12-2. The units 12-1, 12-2 and 12-6, collectively, are a private write through cache memory for processing unit 12-4. As previously mentioned, the processing unit 12-4 is constructed from an INTEL 80386 CPU chip 12-40. Processing unit 12-4 further includes the clock control circuits of block 12-42. These circuits, as discussed later herein, generate high frequency clock pulse signals for synchronizing the operation of the circuits within each of the units 12-1, 12-2, 12-4 and 12-6 of CPU 12 according to the present invention.

The bus watcher unit 12-1 monitors the operations taking place on asynchronous system bus 19. It is connected to receive the address and control information pertaining to each request transferred between any two units on system bus 19 during a bus cycle of operation. For example, bus watcher unit 12-1 captures address and control information signals pertaining to each request in the stages of a buffer 12-10. The buffer 12-10 is a register/counter implemented using a counter chip part such as part number 74AS869 manufactured by Texas Instruments Inc. This allows the incrementing of addresses when circuits associated with buffer 12-10 detect the occurrence of a directory address boundary crossing.

The synchronizer circuits of block 12-16 as shown receive the asynchronous control signals from system bus 19 which define the type of bus cycle or request and convert them into synchronous valid signals making them compatible with the synchronous operation of the system of FIG. 2. These signals are generated by a clocked programmable array logic circuit similar to the circuits later described herein. The valid signals are used to load the address information signals of each main memory write cycle or main memory write request captured in buffer 12-10 into one of the locations of synchronously operated first in first out (FIFO) buffer 12-14.

The FIFO 12-14 is implemented using 16×5 bit FIFO chip parts such as part number 74ALS233. It provides sufficient storage for queuing up to 16 consecutive write cycles of address information signals. As shown, FIFO 12-14 includes control circuits shown in greater detail in FIG. 3e which control the operation thereof. This includes the generation of a request signal FFASKK−00 for transferring FIFO addresses to duplicate directory section 12-2.

It will be noted that the address transfer to FIFO 12-14 proceeds by way of a two input selector circuit 12-12. This circuit is implemented using two sets of tristate register stages such as part number 74S374 manufactured by Texas Instruments Inc. One set of registers receives the 27 address bits from counter register 12-10 while the other set of registers receives 27-bit address bits from CPU 12-4. A different one of a complementary pair of bus error signals derived from system bus 19 is applied to the control select terminals of each set of registers. This enables the CPU address to be selected for transfer into the FIFO 12-14 upon the occurrence of a bus error which results in the error signal being forced to a binary ZERO. In the absence of any error, the FIFO address received from the system bus 19 and clocked into counter register 12-10 is transferred to FIFO 12-14.

As seen from FIG. 2, the output 27 tag and index address bits from FIFO 12-14 are applied as a first input to the duplicate directory section 12-2. The 27 tag and index address bits from CPU 12-4 are applied as a second input. As described herein, duplicate directory 12-20 includes tristate input register stages of FIG. 3e which are enabled for storing these addresses which are selectively applied to an 8K duplicate directory store included within block 12-20.

The directory store is constructed from 8-bit slice cache address comparator circuits having part number TMS2152 manufactured by Texas Instruments Inc. The duplicate directory store is organized into two levels (levels 0 and 1), each of which contain 4096 locations. Additionally, duplicate directory 12-20 receives further inputs in the form of replace select signals RPLSEL−00 and RPLSEL+00 from a tie-breaker circuit 12-22. These signals selectively enable the input tristate register stages of FIG. 3e.

As shown, duplicate directory 12-20 further includes control circuits some of which are shown in greater detail in FIG. 3e. These circuits generate the required selection, read and write control signals for controlling the operation of duplicate directory store as described herein.

The duplicate directory tie-breaker circuit 12-22, shown in greater detail in FIG. 3d, in response to request signals FFASKK−00 and DDRPRQ−00 from FIFO 12-14 and CPU main directory control circuits 12-42 respectively resolves any conflict by serializing requests which occur at the same time. As explained herein, this is accomplished through the use of out of phase clock signals.

As shown, the cache memory unit 12-6 utilized by CPU 12-40 includes a second tie-breaker circuit 12-60, the main directory and directory control circuits of block 12-62 and the data store and data store control circuits of block 12-64. The tie-breaker circuit 12-60 shown in greater detail in FIG. 3b operates in a manner similar to the tie-breaker circuit 12-22 in resolving conflicting requests from duplicate directory section 12-2 and CPU main directory control circuits 12-42. As shown, tie-breaker 12-60 receives invalidate entry (INVENT) request signals from the duplicate directory control circuits of block 12-20 and CPU request (CPUADS) signals from CPU 12-40. In response to these signals, tie-breaker circuit 12-60 generates invalidate select output signals INVSEL+00 and INVSEL−00 as inputs to the cache main directory circuits.

The cache main directory circuits of block 12-62 further includes tristate input register stages of FIG. 3c which are enabled for storing the input 27 tag and index address bits from CPU bus 12-5 and FIFO 12-14 in a fashion similar to that of duplicate directory 12-20. The addresses are selectively applied as inputs to an 8K main directory store included in block 12-60. This store is also organized like duplicate directory 12-20 and is constructed from 8-bit slice cache address comparator circuits having part number TMS2152 manufactured by Texas Instruments Inc.

Additionally, main directory 12-60 receives further inputs in the form of invalidate select signals INVSEL+00 and INVSEL−00 from main tie-breaker circuit 12-60. These signals are used to selectively enable the input tristate register stages of the main directory input section of FIG. 3c.

As shown, main directory 12-62 further includes control circuits, some of which are shown in greater detail in FIG. 3c. These circuits generate the required selection, read and write control signals for controlling the operation of the main directory store as described herein.

The main directory circuits of block 12-62 generate as outputs, hit and level number signals designating where in a buffer data store 12-64 information is to be written or read. The cache main buffer store has 32K byte X 8-bit locations organized on a byte basis into two levels. The cache main store is constructed from 4K X 4-bit random access memory chips having part number 6167 or CY7C167 manufactured by Cypress Corporation. As seen from FIG. 2, the cache main store 12-64 further includes control circuits which are similar to the directory control circuits. These circuits generate the required selection, read and write control signals for controlling the operation of the main store.

DESCRIPTION OF FIGS. 3a THROUGH 3e

Figure 3A:
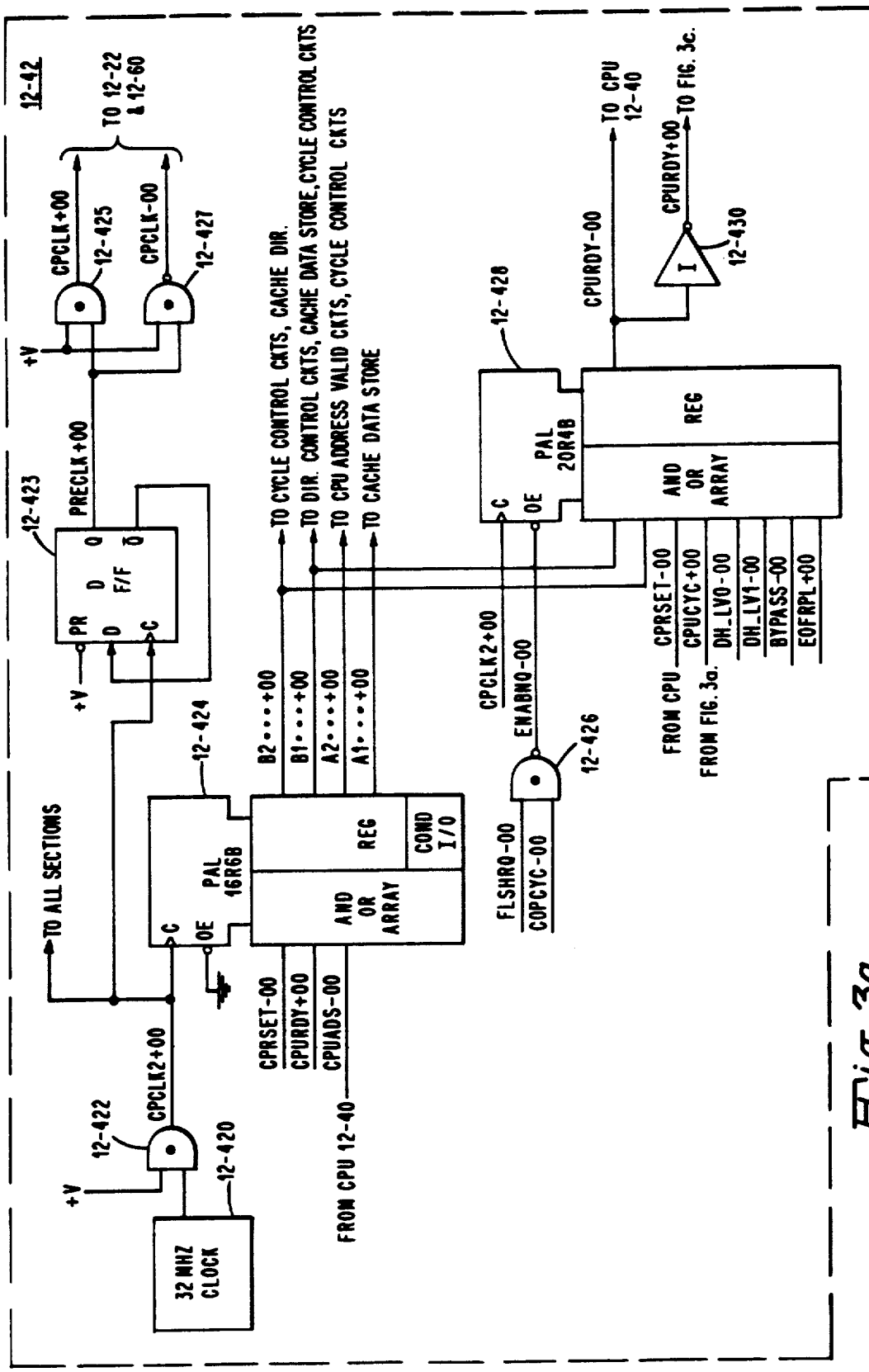

With reference to FIGS. 3a through 3e, different sections of the data processing unit 12 will now be described. FIG. 3a shows in greater detail the clocking circuits of block 12-42. As shown, these circuits include a 32 megahertz free running clock circuit 12-420 which applies clock pulses at a 31 nanosecond rate to the clock input of a timing programmable array logic (PAL) circuit 12-424 via an input AND gate 12-422. Additionally, clock signal CPCLK2+00 is applied to a D-type flip-flop 12-423 which generates clock signal PRECLK+00.

The 16 megahertz signal is used to generate complementary clock signals CPCLK+00 and CPCLK−00 via an AND gate 12-425 and a NAND gate 12-427. These out of phase clock signals are applied to the tie-breaker circuits 12-22 and 12-60. The clocked timing PAL circuit 12-424, in response to a CPU ready signal CPURDY+00, a CPU address strobe signal CPUADS−00, directory hit level signals DH,LV0−00 and DH,LV1−00, and a bypass signal BYPASS−00, generates a sequence of state signals A1 ... +00 through B2 ... +00. These signals are distributed to the various sections of FIG. 2. Signal CPRSET-00 serves as a system initialization signal. It enables the circuits within each section to start from the correct state following a system reset operation.

The state signals A1 ... +00 through B2 ... +00 represent the different cycles or states through which CPU 12-40 sequences. More specifically, CPU 12-40 for each external cycle denoted by signal CPUADS−00 which involves the transfer on synchronous internal bus 12-5 sequences through all four states A1, A2, B1, B2, in response to four consecutive clock pulses. For example, when CPU 12-40 is performing internal operations, it switches between states A1 and A2. As soon as address strobe signal CPUADS-00 is generated indicating the performance of an external cycle, CPU 12-40 switches to state B1 and continues to switch between states B1 and B2 until the end of the external cycle at which time either the requested data has been transferred to CPU 12-40 or the CPU data has been written into memory.

The timing PAL circuit 12-424 state output signals B1 . . . +00 and B2 . . . −00 are applied as inputs to a second clocked programmable array logic circuit 12-428. This circuit is enabled via NAND gate 12-426 in the absence of a flush request (i.e., FLSHRQ-00=1) and another processor/coprocessor cycle (i.e., COPCYC-00=1). In response to initialize signal CPRSET−00 from CPU 12-40 and CPU cycle signal CPUCYC+00 from main tie-breaker circuit 12-60 of FIG. 3b, PAL circuit 12-428 and an inverter circuit 12-430 force CPU ready signals CPURDY+00 and CPURDY−00 to binary ONE and ZERO states respectively. The ready signal CPURDY−00 is applied to the ready input terminal of the bus control section of the 386 CPU chip to signal that the cycle has been completed and the CPU's request processed (e.g. requested data on synchronous bus 12-5 is ready for acceptance by the CPU). The ready signal CPURDY+00 is distributed to the control circuits of the other sections of FIG. 2.

As seen from FIG. 3a, the PAL circuits 12-424 and 12-428 are constructed from standard clocked programmable array logic elements having part numbers AmPAL16R6B and AmPAL20R4B, manufactured by Advanced Micro Devices, Inc. For further details, reference may be made to the equations of the Appendix.

Figure 3B:
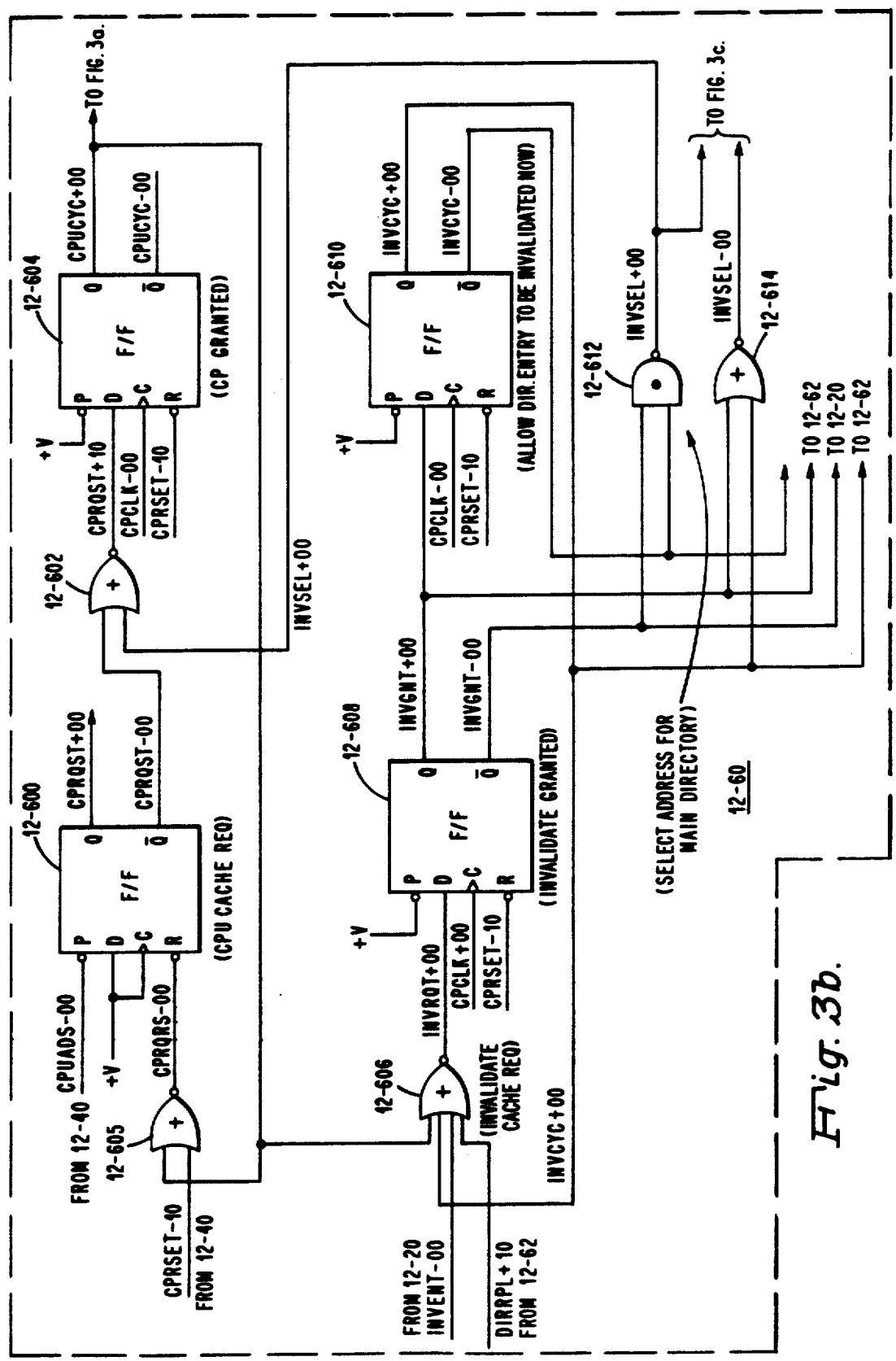

FIG. 3b shows in detail, the CPU main cache directory tie-breaker circuit 12-60. Circuit 12-60 includes series connected synchronous D-type flip-flops 12-600, 12-604, 12-608 and 12-610 which connect through NOR gate circuits 12-602 and 12-606 as shown. In response to each external cycle signalled by CPU address strobe signal CPUADS-00 being forced to a binary ZERO, CPU cache request flip-flop 12-600 is switched to a binary ONE. Normally, this forces CPU request signal CPRQST−00 to a binary ZERO which in turn causes CPU granted flip-flop 12-604 to switch to a binary ONE state on the positive going edge of clock signal CPCLK−00. However, when an invalidate select signal INVSEL+00 is forced to a binary ONE, this inhibits NOR gate circuit 12-602 from forcing CPU request signal CPRQST+10 to a binary ONE.

When CP granted flip-flop 12-604 switches signal CPUCYC+00 to a binary ONE, this signal causes an input NOR gate circuit 12-605 to reset CPU cache request flip-flop 12-600 to a binary ZERO by forcing signal CPRQRS−00 to a binary ZERO. Also, CPU cycle signal CPUCYC+00 inhibits the switching of invalidate granted flip-flop 12-608 by causing invalidate cache request NOR gate circuit 12-606 to force invalidate request signal INVRQT+00 to a binary ZERO.

As seen from FIG. 3b, NOR gate circuit 12-606 also forces invalidate request signal INVRQT+00 to a binary ZERO upon the receipt of CPU replace request (i.e., signal DIRRPL+10=1) and in the absence of an invalidate entry request (i.e., signal INVENT-00=1). The invalidate granted flip-flop 12-608 is switched to a binary ONE state in response to signal INVRQT+00 on the positive going edge of CPU clock signal CPCLK+00.

The setting of invalidate granted flip-flop 12-608 to a binary ONE causes signals INVGNT+00 and INVGNT−00 to be forced to a binary ONE and a binary ZERO respectively. Signal INVGNT−00 is applied as an input to a NAND gate 12-612. When a binary ZERO signal INVGNT−00 causes NAND gate 12-612 to force invalidate select signal INVSEL+00 to a binary ONE inhibiting CP request NOR gate 12-602 from switching the state of CP granted flip-flop 12-604 in response to any further requests until the cycle has been completed as explained herein. Signal INVGNT+00 is applied as an input to NOR gate 12-614. When a binary ONE signal INVGNT+00 causes NOR gate 12-614 to force invalidate select signal INVSEL−00 to a binary ZERO, signal INVGNT+00 also causes allow directory entry to be invalidated now flip-flop 12-610 to be switched to a binary ONE on the next positive going edge of clock signal CPCLK−00. This causes invalidate cycle signals INVCYC+00 and INVCYC−00 to be forced to a binary ONE and a ZERO respectively. Signals INVCYC+00 and INVCYC−00 are applied as inputs to NAND gate 12-612 and NOR gate 12-614 respectively and continue to hold the pair of complementary invalidate select signals INVSEL+00 and INVSEL−00 in the same states as mentioned. These select signals are applied to the input register address circuits of FIG. 3c.

FIG. 3c shows in detail, the input register section 12-620 and the cycle control section 12-630 of cache main directory 12-62. As seen from FIG. 3c, the input register section 12-620 includes the tristate register circuits 12-622 and 12-624 and driver circuit 12-626. The stages of tristate register circuit 12-622 which connect to bus 12-5 is loaded with CPU tag address bits CPAD03+00 through CPAD13+00 received from address bus 12-5 in response to CPU address valid signal CPADVL−00 from CPU 12-40. The CPU tag address bit contents of register circuits 12-622 are applied as inputs to the main directory store when invalidate select signal INVSEL+00 applied to the control input terminal F is forced to a binary ZERO.

The stages of tristate register circuits 12-624 which connect to FIFO 12-14 are loaded with FIFO tag address bits FFAD03+00 through FFAD13+00 in response to FIFO signal UNCKFF+00. The FIFO tag address bit contents of register circuits 12-624 are applied as inputs to the main directory store when invalidate select signal INVSEL−00 applied to the control input terminal F is forced to a binary ZERO. The driver circuit 12-626, in response to invalidate select signal INVSEL−00, forces a valid directory address bit VALID+CP to the appropriate state for writing into the main directory store valid address bit position.

The cycle control section 12-630 includes a main directory cycle programmable array logic circuit 12-632 and a main directory write control circuit 12-634. As shown, clocked PAL circuit 12-632 generates directory control signals DIRHIT−00 through DDRPRQ−00 in response to CPU state signal B1 . . . +00, CPU signals CPUW_R+00 through CPUCYC+00, main directory hit signals DH LV0−00, DH_LV1−00, duplicate directory signal DDRPGT+00, bypass signal BYPASS−00 and flush request signal FLSHRQ−00. For further details relating to the generation of these signals, reference may be made to the equations in the Appendix.

The clocked PAL circuit 12-634 generates directory write signals WRLEV0−00 and WRLEV1−00 in response to CPU signals CPUW_R+00 through CPUCYC+00, main directory hit signals DH_LV0−00 and DH LV1−00, invalidate signals INVCYC+00 and INVGNT+00, FIFO signal FFOLEV+00, LRU level signal LRULEV+00 from LRU memory circuits conventional in design and bypass signal BYPASS-00. For further details relating to the generation of these signals, reference may be made to the equations of the Appendix.

The tristate register circuits, driver circuit and control circuits of FIG. 3c may be constructed from standard integrated circuit parts, such as part numbers 74F373 and 74S241, manufactured by Texas Instruments Inc. and AmPAL20R6B and AmPAL20R4B, manufactured by Advanced Micro Devices, Inc.

FIG. 3d shows in detail, the duplicate directory tiebreaker circuit 12-22. It is implemented in the same manner as the main directory tie-breaker circuit 12-60. Briefly, circuit 12-22 includes series connected synchronous D-type flip-flops 12-220, 12-224, 12-228 and 12-230 which connect through NOR gate circuits 12-222 and 12-226, as shown. In response to each FIFO request signalled by FIFO ask signal FFASKK−00 being forced to a binary ZERO, FIFO request flip-flop 12-220 is forced to a binary ONE. Normally, this causes NOR gate circuit 12-222 to force FIFO request signal FFREQT+10 to a binary ONE which in turn forces FIFO granted flip-flop 12-224 to a binary ONE state on the positive going edge of clock signal CPCLK−00. However, when a replace select signal RPLSEL+00 is forced to a binary ONE, this inhibits NOR gate circuit 12-222 from forcing FIFO request signal FFREQT+10 to a binary ONE.

When the FIFO granted flip-flop 12-224 switches signal FFOCYC+00 to a binary ONE, this signal inhibits the switching of CPU replace granted flip-flop 12-228 by causing replace request NOR gate 12-226 to force replace request signal RPREQT+00 to a binary ZERO.

As seen from FIG. 3d, replace request gate circuit 12-226 also forces replace request signal RPREQT+00 to a binary ZERO upon the receipt of an invalidate entry request (i.e., signal INVENT+10=1) and when signal EOFDDR+00 is forced to a binary ONE. Signal RPREQT+00 is switched to a binary ONE upon receipt of a duplicate directory replace request (i.e., signal DDRPRQ-00=1), during a duplicate directory replace cycle (i.e., signal DDRPCY+00). The CPU replace granted flip-flop is switched to a binary ONE state in response to signal RPREQT+00 on the positive going edge of CPU clock signal CPCLK+00.

The setting of CPU replace granted flip-flop 12-228 to a binary ONE causes signals DDRPGT+00 and DDRPGT−00 to be forced to a binary ONE and a binary ZERO respectively. Signal DDRPGT−00 is applied as an input to a NAND gate 12-232. When a binary ZERO, signal DDRPGT−00 causes NAND gate 12-232 to force replace select signal RPLSEL+00 to a binary ONE inhibiting FIFO grant NOR gate 12-222 from switching the state of FIFO granted flip-flop 12-224 in response to any further requests until the replace cycle has been completed as explained herein. Signal DDRPGT+00 is applied as an input to a NOR gate 12-234.

When a binary ONE, signal DDRPGT+00 causes NOR gate 12-234 to force replace select signal RPLSEL−00 to a binary ZERO. Signal DDRPGT−00 also causes allow duplicate directory update flip-flop 12-230 to be switched to a binary ONE on the next positive edge of clock signal CPCLK−00. This forces directory replace cycle signals DDRPCY+00 and DDRPCY−00 to a binary ONE and a ZERO respectively. Signals DDRPCY+00 and DDRPCY−00 are applied as inputs to NAND gate circuit 12-232 and NOR gate circuit 12-234 respectively and continue to hold replace select signals RPSLEL+00 and RPLSEL−00 in the same states mentioned. These select signals are applied to the input register address circuits of FIG. 3e.

FIG. 3e shows in detail, the input register section 12-200 and the control section 12-210 of cache duplicate directory 12-20 in addition to the control section 12-140 of FIFO 12-14. As seen from FIG. 3e, the input register section 12-200 includes the tristate register circuits 12-202 and 12-204 and driver circuit 12-206. The stages of the tristate register 12-202 which connect to bus 12-5 is loaded with CPU tag and index address bits CPAD03+00 through CPAD28+00 received from address bus 12-5 during each bus cycle. The CPU tag and index address bit contents are applied as inputs to the duplicate directory store when replace select signal RPLSEL−00 applied to the control input terminal F is forced to a binary ZERO. Also, a binary ONE is written into a duplicate directory valid bit position.

The stages of tristate register circuit 12-204 which connect to FIFO 12-14 are loaded with FIFO tag and index address bits FFAD03+00 through FFAD28+00 in response to bus watcher control signal CKFFAD−00 during a FIFO cycle. The FIFO tag and index address bit contents of register circuits 12-204 are applied as inputs to the duplicate directory store when replace select signal RPLSEL+00 is in a binary ZERO state. The driver circuit 12-206, in response to invalidate grant signal INVGNT−00, forces a valid duplicate directory address bit signal DDVALD+FF to the state defined by signal INVGNT−00 during compare cycle in which signal DDVALD+FF is forced to a binary ONE, or an invalidate cycle in which signal DDVALD+FF is forced to a binary ZERO for writing into the duplicate directory store valid address bit position.

The control section 12-210 includes a clocked duplicate directory write control programmable array logic circuit 12-212 and a clocked duplicate directory hit control programmable array logic circuit 12-214. As shown, clocked PAL circuit 12-212 generates duplicate directory write control signals DDWEL0−00 and DDWEL1−00 in response to invalidate entry signal INVENT−00, FIFO signals FFOLEV+00 and FFOCYC+00 and CPU reset signal CPRSET−00. For further details relating to the generation of these signals, reference may be made to the equations in the Appendix.

The clocked PAL circuit 12-214 and inverter circuit 12-216 generate invalidate entry signals INVENT−00 and INVENT+10, in addition to signal EOFDDR+00, in response to CPU signal CPRSET−00, CPU ready signal CPURDY+10, duplicate directory hit signals DDH_L0+01 through DDH_L1+02, invalidate grant signal INVGNT+00, FIFO cycle signal FFOCYC+00, duplicate directory replace cycle signal DDRPCY+00, bypass signal BYPASS+00, replace select signal RPLSEL+00 and flush request signal FLSHRQ−00. For further details relating to the generation of these signals, reference may be made to the equations of the Appendix.

The FIFO control section 12-140 includes a single clocked programmable logic array circuit 12-140. The clocked PAL circuit 12-140 generates FIFO request signal FFASKKK−00, clock FIFO address signal CKFFAD−00, FIFO not empty signal NOTEMP−00 and FIFO unclocked signal UNCKFF+00 in response to FIFO cycle signal FFOCYC+00, invalidate entry signal INVENT−00, FIFO empty signal FFEMPT−00, FIFO load control signal FFLDCK+00, flush request signal FLSHRQ−00, duplicate directory flush signal DDFLSH−00, duplicate directory replace granted signal DDRPGT+00 and bypass signal BYPASS+00. For further details relating to the generation of these signals, reference may be made to the equations of the Appendix.

DESCRIPTION OF OPERATION

With reference to FIGS. 2 through 3e, the operation of the preferred embodiment of the present invention will now be described with reference to the timing diagrams of FIGS. 4a through 4c. FIGS. 4a and 4b show the independent operation of the cache main directory tie-breaker circuit 12-60 and cache duplicate directory tie-breaker circuit 12-22 in granting independent access to cache main directory 12-62 and cache duplicate directory 12-20. This arrangement provides a high performance of operation for CPU 12-40 in accessing cache while at the same time maintaining cache coherency. That is, entries stored in the duplicate directory are accessed in response to FIFO requests. For the most part, there will be no need to invalidate cache entries, since the memory traffic taking place on asynchronous bus 19 will not normally involve any data being used by CPU 12-40.

FIGS. 4a and 5a illustrate diagrammatically, the operation of the duplicate and main directories in processing FIFO and CP requests independently during successive cycles of operation. More specifically, as seen from FIG. 4a, when the duplicate directory tie-breaker circuit 12-22 of FIG. 3d receives a FIFO request at the same time that a CP replacement request is received from the circuits of block 12-62, this results in a compare cycle being first performed by the duplicate directory circuits of block 12-20 in response to the FIFO request. During the compare cycle, the CP request is prevented by the tie-breaker circuit 12-22 from gaining access to the duplicate directory circuits. At the end of the cycle, when the compare circuits have detected a miss indicating that the FIFO request address is not stored in the duplicate directory, the next duplicate directory cycle is assigned to process the CP replacement request. This results in the allocation of the location specified by the CP request address.

FIG. 5a shows that when the main directory tie-breaker circuit 12-60 of FIG. 3b receives a CP request at the same time that an invalidate request is received from the duplicate directory circuits of block 12-20, this results in a compare cycle being first performed by the main directory circuits of block 12-62 in response to the CP request. During the compare cycle, the invalidate request is prevented by tie-breaker circuit 12-60 from gaining access to the main directory circuits. At the end of the main directory cycle, when the compare circuits have detected a hit indicating that the CP request address is stored in the main directory, the next main directory cycle is assigned or granted to process the invalidate request. This results in the invalidation of the location specified by the invalidate request.

FIGS. 4a and 5a show that both requests are received simultaneously, and that both tie-breaker circuits can be performing cycles of operation. This is shown in greater detail in FIGS. 6a and 6b. Here, the duplicate directory tie-breaker 12-20 is performing a FIFO cycle while the main directory tie-breaker 12-60 is performing a CPU cycle at the same exact time However, the out-of-phase timing of tie-breaker circuits 12-20 and 12-60 serializes the handling of the simultaneously received requests.

While, in most circumstances, requests can be processed as shown in FIGS. 4a and 5a, there are situations in which such processing can result in incoherency. The apparatus of the present invention recognizes those sequences that can cause incoherency and automatically assigns uninterrupted sequences of cycles within the duplicate and main directories to complete the processing of the request of one source before allowing access by the source. FIGS. 4b and 5b illustrate the two situations or conditions under which incoherency could result and the different sequences of cycles performed by the directories which eliminate the possibility of cache incoherency.

Referring to FIG. 4b, it is seen that an incoherent condition can result when the compare cycle performed by the duplicate directory circuits 12-20 in response to a FIFO request detects a hit or match and the next duplicate directory cycle is granted to the CP request. If the CP request specifies the address of the same entry/location, it causes the entry to be invalidated following its reallocation. Thus, the entry in the main directory is valid, while the same entry in the duplicate directory circuits 12-20 is invalid resulting in cache incoherency.

As shown in FIG. 4b, this situation is avoided by having the duplicate directory circuits 12-20 perform the indicated uninterrupted sequence of cycles. This enables the processing of the FIFO request to be completed while, at the same time, inhibiting access to the duplicate directory circuits 12-20 by the CP request. The tie-breaker circuit 12-22 following this sequence grants the next duplicate directory cycle to allocate/-reallocate an entry within the duplicate directory 12-20. Even if the entry is the same as the one which was invalidated in the previous cycle, no incoherency will result.

FIG. 5b illustrates the situation in which incoherency can result when the compare cycle performed by the main directory 12-62 in response to a CP request results in a miss and the next main directory cycle is granted to the invalidate request. If the invalidate request specifies the address of the same entry/location, it causes the entry to be allocated following its invalidation. Thus, the entry in the main directory is valid while the same entry in the duplicate directory circuits 12-20 is invalid, again resulting in incoherency.

As shown in FIG. 5b, this situation is avoided by having the main directory circuits 12-62 perform the indicated uninterrupted sequence of cycles. This enables the processing of the CP request to be completed while, at the same time, inhibiting access to the main directory circuits 12-62 by the invalidate request. The tie-breaker circuit 12-60 following this sequence grants the next main directory cycle to invalidate an entry within the main directory 12-62. Accordingly, even if the entry is the same as the one which was allocated in the previous cycle, no incoherency will result.

Figure 6A:
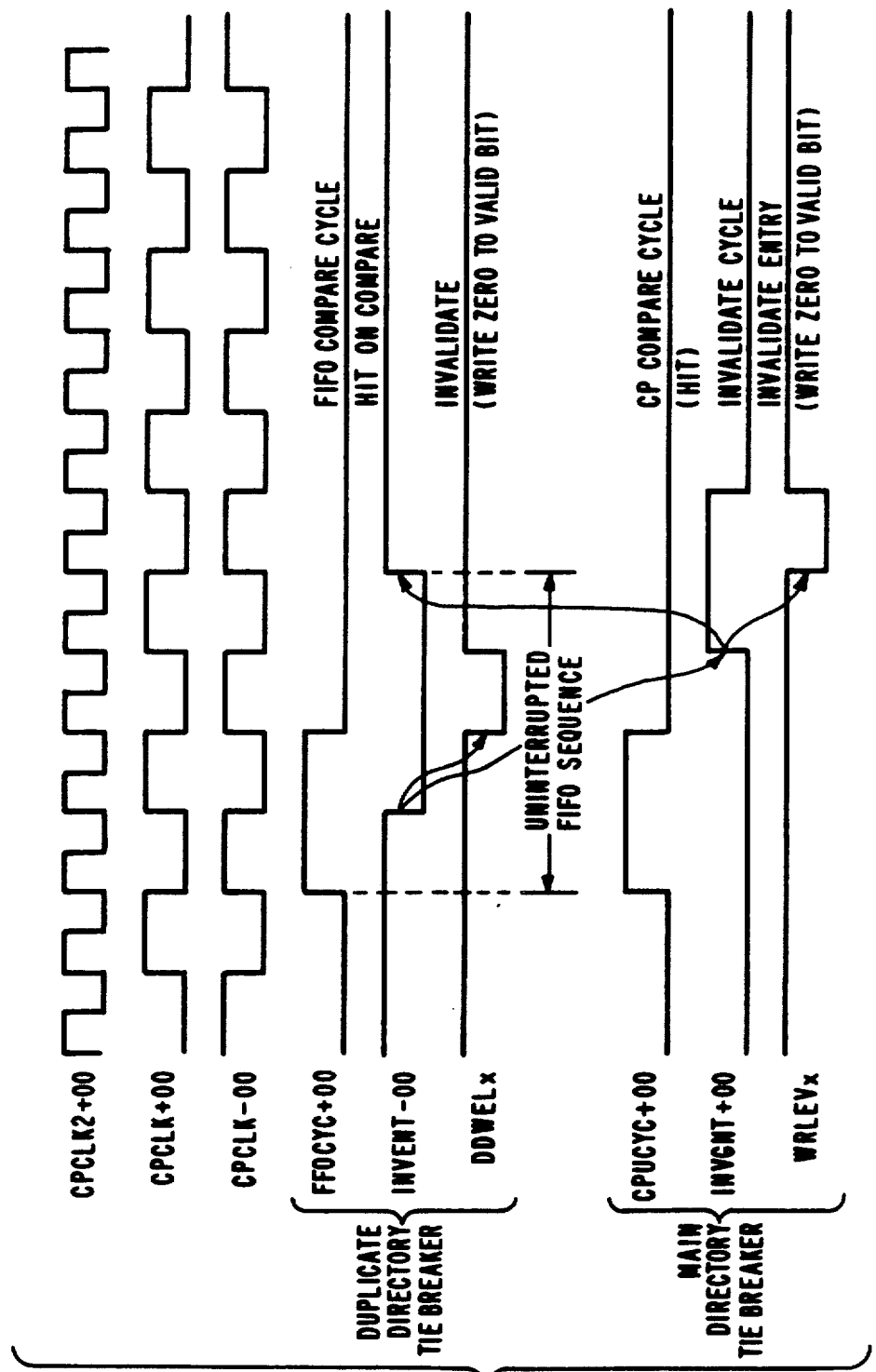
FIGS. 6a and 6b illustrate the synchronous state operation of the present invention in processing requests.
Figure 6B:
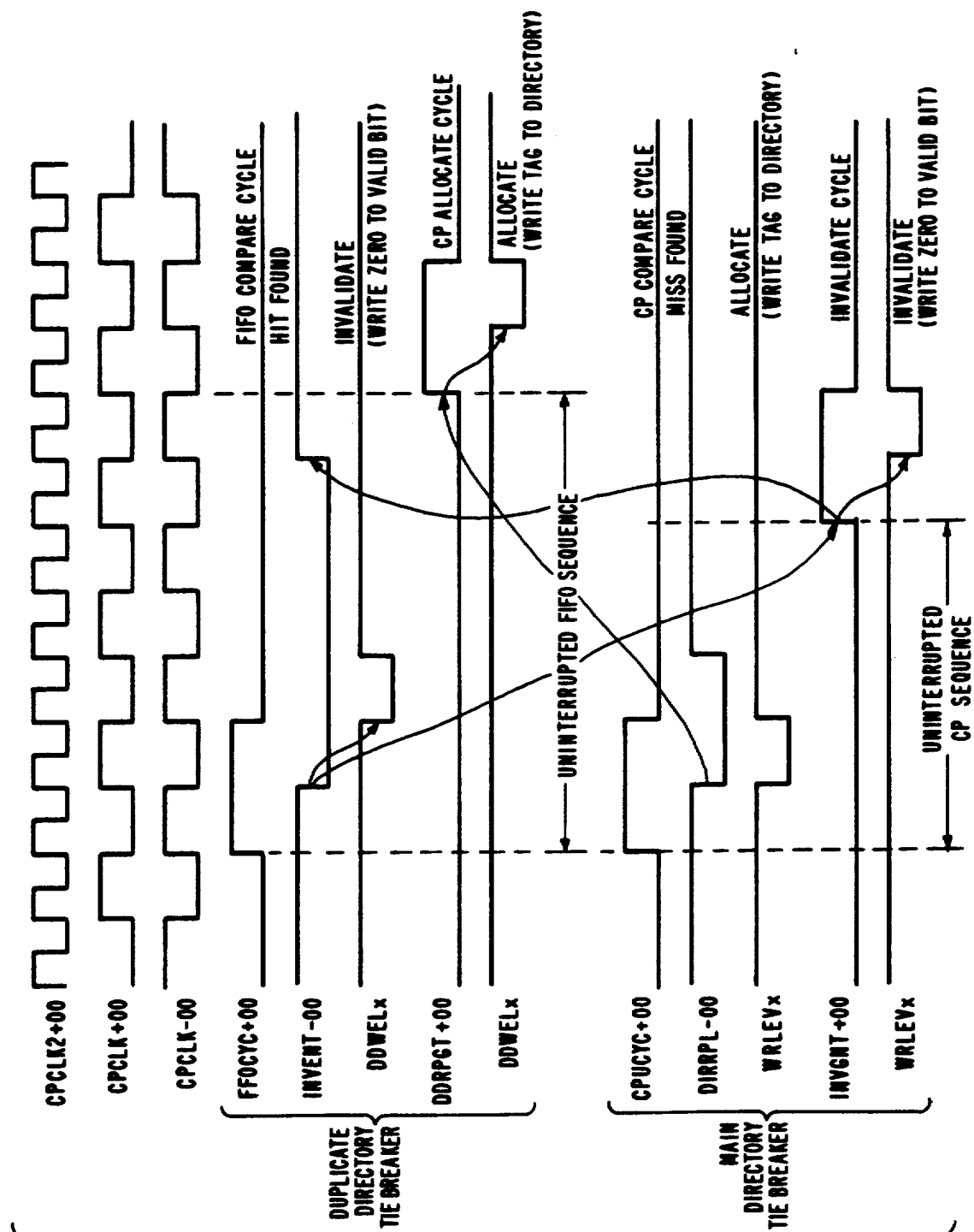

DESCRIPTION OF SYNCHRONOUS OPERATION FIGS. 6a AND 6b

The synchronous state operation of the system of the present invention ensures the coherent operation of cache memory through the above discussed sequences of uninterrupted directory cycles. FIG. 6a illustrates in greater detail, the synchronous operations of tie-breaker circuits 12-22 and 12-60 in processing requests. In FIG.

6a, it is seen that the clock circuits 12-420, 12-422, 12-423 and 12-425 generate signals CPCLK2+00, CPCLK+00 and CPCLK−00 which have the phased relationships shown.

It is seen that both tie-breaker circuits 12-22 and 12-60 independently operate to process FIFO and CP requests. This can result in both the FIFO granted flip-flop 12-224 and CP granted flip-flop 12-604 being both set to binary ONES on the positive going edge of clock signal CPCLK−00. More specifically, when a FIFO request has been loaded into FIFO 12-14, this causes PAL circuit 12-140 to force signal FFASKK−00 to a binary ZERO. This switches FIFO request flip-flop 12-220 to a binary ONE causing NOR gate 12-222 to force FIFO request signal FFREQT+10 to a binary ONE.

On the positive going edge of CP clock signal CPCLK−00, FIFO granted flip-flop 12-224 switches to a binary ONE. This forces signal FFOCYC+00 to a binary ONE which, in turn, inhibits replace request NOR gate 12-226 from responding to CP replace signal DDRPRQ−00. In response to signal FFOCYC+00, FIFO request duplicate directory control PAL circuit 12-140 forces clock FIFO address signal CKFFAD−00 to a binary ZERO which enabled the loading of FIFO register circuits 12-204 with the FIFO request address.

As seen from FIG. 6a, when the duplicate directory compare circuits 12-20 detect a hit or match from comparing the FIFO address tag and valid bits with the tag and valid bit contents of the duplicate directory circuits 12-20. This results in one of the duplicate directory hit signals DDH,L0+01 through DDH,L1+02 being forced to a binary ONE. This causes the duplicate directory hit control PAL circuit 12-214 to force invalidate entry signal INVENT−00 to a binary ZERO. Signal INVENT−00 is clocked or changes state on a positive going edge of signal CPCLK2+00.

At the same time, write duplicate directory PAL circuit 12-212 forces a corresponding one of the signals DDWEL0−00 and DDWEL1−00 to a binary ZERO state in response to the positive going edge of signal CPCLK2+00. This enables driver circuit 12-206 to write a binary ZERO into the valid bit position of the indexed duplicate directory location which matched the address tag bits FFAD03+00 through FFAD13+00 applied via register circuits 12-204.

As seen from FIG. 6a, the tie-breaker circuit 12-60 also was responding to a CP request. That is, CPU 12-40 had generated a read request by forcing signal CPUADS−00 to a binary ZERO. This resulted in the setting of CPU request flip-flop 12-600. The switching of CPU request flip-flop 12-600 forced signal CPRQST−00 to a binary ZERO causing NOR gate 12-602 to force signal CPRQST+10 to a binary ONE. On the positive going edge of CPU clock signal CPCLK−00, the CPU granted flip-flop switched to a binary ONE. This forced CPU cycle signal CPUCYC+00 to a binary ONE.

The CPU cycle signal CPUCYC+00 inhibited NOR gate 12-606 from responding to any invalidate entry request corresponding to signal INVENT−00 generated by duplicate directory circuits 12-20. As seen from FIG. 3b, since signals INVGNT−00 and INVCYC−00 are both binary ONES, NAND gate 12-612 held invalidate select signal INVSEL+00 at a binary ZERO. This caused the register circuits 12-622 of FIG. 3c to apply the CPU tag address bits CPAD03+00 through CPAD13+00 as an input to the CPU main directory store.

The CPU main directory store address comparison circuits compared the CPU tag address bits with the contents of the main directory contents during the CPU cycle. Since there was a match, this results in one of the directory hit signals DH,LV0−00 and DH,LV1−00 being forced to a binary ZERO state. The occurrence of a hit prevents PAL circuit 12-632 of FIG. 3c from forcing any change of state in main directory replace signal DIRRPL−00. Therefore, signal DIRRPL+10 remains in a binary ZERO state.

As seen from FIG. 3b, signal CPUCYC+00 resets CPU cache request flip-flop 12-600 so that on the next positive going edge of CPU clock signal CPCLK−00, CP granted flip-flop 12-604 is reset to a binary ZERO. This completes the compare cycle as shown in FIG. 6a. As soon as signal CPUCYC+00 switched to binary ZERO, NOR gate 12-606 responds to invalidate request signal INVENT−00 by forcing signal INVRQT+00 to a binary ONE. On the positive going edge of CPU clock signal CPCLK+00, signal INVRQT+00 switches invalidate granted flip-flop 12-608 to a binary ONE state. This in turn forces signal INVGNT+00 to a binary ONE state as shown in FIG. 6a. On the next positive going edge of CPU clock signal CPCLK−00, the allow directory entry to be invalidated now flip-flop 12-610 is switched to a binary ONE state.

As soon as signal INVGNT+00 switched to a binary ONE, this caused NOR gate 12-614 to force invalidate select signal INVSEL−00 to a binary ZERO. This results in the FIFO index address contents of the tristate register stages 12-624 of FIG. 12-62 being applied as an input to the main directory store. Additionally, driver circuit 12-626 forced valid bit signal VALID+CP to a binary ZERO. When invalidate cycle signal INVCYC+00 switches to a binary ONE, this caused the main directory write control PAL circuit 12-630 of FIG. 3c to force one of its write output signals WRLEV0−00, WRLEV1−00 to a binary ZERO as shown in FIG. 6a.

This results in accessing the specified location and a binary ZERO bit being written into the valid address bit location of the main directory store invalidating the corresponding tag address. No comparison is performed by the main directory circuits during this cycle since the duplicate directory compare circuits have previously performed a compare which resulted in the generation of the invalidate entry request (i.e., signal INVENT−00). On the next positive going edge of clock signal CPCLK2+00 following the switching of signal INVGNT+00 to a binary ONE, invalidate entry signal INVENT−00 is switched to a binary ONE. It is seen from FIG. 6a, that the invalidate request can gain access to the main directory circuits 12-62 immediately following the CP compare cycle in the case of a hit.

FIG. 6b shows the situation in which both the duplicate and main directory circuits both perform uninterrupted sequence of cycles in maintaining coherency. Here, it is necessary to allocate a location in main directory 12-62 due to the fact that the CPU requested data is not stored in the main cache store 12-64. In the same manner as described above, duplicate directory circuits 12-20 cause the invalidation of a duplicate directory location in response to a FIFO request. Also, as previously described, the CPU granted flip-flop 12-604 of FIG. 3b is set in response to the CPU cache request.

Again, signal CPUCYC+00 switches to a binary ONE state inhibiting the invalidate granted flip-flop 12-608 from being set in response to the invalidate entry request. During this CPU cycle, the main directory 12-62 compares the CPU index address contents of tristate register stages 12-622 to determine whether or not it is necessary to replace any entry in the main directory 12-62.

Here, the main directory compare circuits detect a miss condition which causes main directory cycle PAL circuit 12-632 to force directory replace signals DIRRPL−00 to a binary ZERO and DIRRPL+00 to a binary ONE. Signal DIRRPL+00 causes NOR gate circuit 12-606 to hold invalidate cache request signal in a binary ZERO state blocking out the invalidate entry request. This extends the duration of the CP request processing for another cycle as shown in FIG. 6b. During this next cycle, the CPU index and valid address bits are written into the cache main directory 12-62 in response to signal WRLEVX. That is, since signal INVSEL−00 is a binary ONE at this time, driver circuit 12-626 forces directory entry valid hit signal VALID+CP to a binary ONE state. This results in the allocation of the desired main directory location.

As seen from FIG. 6b, upon the removal of directory replace signal DIRRPL+10, NOR gate circuit 12-606 is able to switch invalidate cache request signal INVRQT+00 to a binary ONE. Thereafter, the invalidate granted flip-flop 12-608 is switched to a binary ONE state on the positive going edge of CPU clock signal CPCLK+00.

In the same manner as described above, the specified main directory location is invalidated. Again, the switching of signal INVGNT+00 to a binary ONE enables signal INVENT−00 to return to a binary ONE as shown in FIG. 6b.

When signal INVENT−00 returns to a binary ONE, the duplicate directory tie-breaker circuit 12-22 allows the CP request signal DDRPRQ−00, generated in response to the miss, access to duplicate directory circuits 12-20. That is, as seen from FIG. 3d, when signal INVENT+10 returns to a binary ZERO, signal DDRPRQ−00 as a result of the miss occurring during the CPU cycle is also a binary ZERO. This causes replace request NOR gate 12-226 to switch CPU replace granted flip-flop 12-228 to a binary ONE on the positive edge of clock signal CPCLK+00. This, in turn, causes signal DDRPGT+00 to switch to a binary ONE as shown in FIG. 6b.

As soon as signal DDRPGT−00 switches to a binary ZERO, NAND gate 12-232 forces replace select signal RPLSEL+00 to a binary ONE while NOR gate 12-234 forces replace select signal RPSEL+00 to a binary ZERO. This inhibits NOR gate 12-222 from granting access to any further FIFO requests while, at the same time, signal RPLSEL−00 enables tristate register circuits 12-202 to be loaded with the CPU tag and index address bits CPAD03+00 through CPAD28+00 from address bus 12-5.

During the next positive edge of clock signal CPCLK2+00, duplicate directory write control PAL circuit 12-212 forces an appropriate one of the duplicate directory write control signals DDWEL0-00 and DDWEL1-00 to a binary ZERO state. This causes the CPU address bits to be written into the appropriate location of duplicate directory store 12-20 as shown in FIG. 6b. As seen from the above, both tie-breaker circuits 12-22 and 12-60 operate in the above described synchronous state fashion in processing requests.

APPENDIX

The equations for generating the programmable array logic signals of FIGS. 3a, 3c and 3d are given by the following Boolean expressions, where the symbols have the following meaning - ! = negation, # = or, & = and:

1. A1 ... +00=(A2 & !CPUADS # B2 & CPURDY) & CPRSET.
2. A2 ... +00=A1 # CPRSET.
3. B1 ... +00=(A2 & CPUADS # B2 & !CPURDY) & !CPRSET.
4. B2 ... −00=B1 & !CPRSET.
5. CPURDY−00=(HIT & !CPUW R & !BYPASS # B1 & EOFRPL) & !CPRSET where HIT=B1 & CPUCYC & DH_LV0 # B1 & CPUCYC & DH_LV1.
6. DIRHIT−00=(HIT_ON_LO & !BYPASS # HIT_ON_L1 & !BYPASS) & !CPRSET where HIT_ON_LO=B1 & CPUCYC & DH_LV0; HIT_ON_L1=B1 & CPUCYC & DH_LV1.
7. RPLACE−00=(!CPUW_R & MISS & !BYPASS # RPLACE & !CPURDY) & !CPRSET where MISS=B1 & CPUCYC & !DH—LV0 & !DH LV1.
8. DIRRPL−00=(!CPUW—R & MISS & !BYPASS # !B1 & CPUCYC & FLSHRQ) & !CPRSET.
9. DDRPRQ−00=(!CPUW_R & MISS & !BYPASS # !B1 & CPUCYC & FLSHRQ #DDRPRQ & !DDRPGT) & !CPRSET.
10. WRLEV0−00=(!CPUW_R & MISS & !LRULEV & !BYPASS # INVGNT & !INVCYC & !FFOLEV) & !CPRSET.
11. WRLEV1−00=(!CPUW_R & MISS & LRULEV & !BYPASS # INVGNT & !INVCYC & FFOLEV) & !CPRSET.
12. DDWEL0−00=(INVENT & FFOCYC & !FFOLEV) & !CPRSET.
13. DDWEL1−00=(INVENT & FFOCYC & FFOLEV) & !CPRSET.
14. FFOLEV+00=(HITL1 # FFOLEV & INVENT) & !CPRSET where HITL1=FFOYCYC (1st half) & DDH_L1+01 & DDH_L1+02.
15. INVENT−00=(HIT & !BYPASS # INVENT & !INVGNT) & !CPRSET where HIT=FFOCYC (1st half) & DDH_L0+01 & DDH_L0+02 # FFOCYC (1st half) & DDH_L1+01 & DDH_L1+02.
16. EOFDDR+00=(FLSHRQ & DDRPCY & !CPURDY # EOFDDR & !CPURDY) & !CPRSET.
17. EOFRPL+00=(RPLACE & DTRMWE & B1 # EOFRPL & !CPURDY) & !CPRSET where DTRMWE is a binary ONE when data is being written into the cache data store.
18. FFASKK−00=WAIT1 & !(FFOCYC # INVENT) & !BYPASS & !(FLSHRQ & DDRPGT) & !DDFLSH, WHERE WAIT1=FFLDCK & !(FFOCYC # INVENT) # NOTEMP & !(FFOCYC # INVENT # UNCKFF) & !BYPASS & !DDFLSH and where UNCKFF=FFOCYC & NOTEMP & !BYPASS & !DDFLSH.
19. CKFFAD−00=(FFOCYC # INVENT) & !BYPASS & !DDFLSH.

DESCRIPTION OF EQUATION TERMS

1. CPRSET=CPU reset which is generated at start-up time.

2. CPURDY−00=CPU ready signal.
3. CPUADS−00=CPU address strobe which is generated by CPU 12-40 to request an external cycle.
4. CPUW,R+00=CPU read write signal.
5. DH_LV0-00 & DH_LV1-00=Directory hit signals generate by the main directory comparison circuits.
6. BYPASS−00=Cache bypass signal.
7. FFOLEV+00=Hit level for duplicate directory.
8. CPULEV+00=Hit level for main directory.
9. DDH_L0+01, Directory hit signals DDH_L0+02, generated by the duplicate DDH_L1+01 & directory comparison DDH_L1+02=circuits.
10. FFEMPT−00=FIFO empty signal.
11. FFLDCK+00=FIFO load signal.
12. CPUCYC=CPU cycle generated by the main directory tie-breaker circuits.
13. DDRPRQ−00=Duplicate directory replace request signal.
14. DDRPGT=Duplicate directory replace request granted signal.
15. LRULEV=Least recently used level signal generated by LRU round robin circuit indicating the level in which the contents of a location are to be replaced.
16. FFOCYC=FIFO cycle generated by the duplicate directory tie-breaker circuits.
17. INVENT=Invalidate entry request signal.
18. INVGNT=Invalidate request granted signal.
19. DDRPCY=Duplicate directory replace cycle.
20. EOFDDR=End of duplicate directory replace cycle.
21. WAIT 1=Wait signal if there is another entry in FIFO to be checked.
22. UNCKFF=Unclock FIFO signal.
23. DDFLSH=Duplicate directory flush signal.
24. NOTEMP=FIFO buffer not empty signal.
25. RPLACE−00=Replace signal which causes the replacement of the contents of a data store location with new information.
26. EOFRPL+00=End of replace signal indicating the completion of the replacement operation.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A private write through cache memory system included in one of a number of processing units for providing fast access to main memory information and which is updated in response to main memory write requests transferred over an asynchronous bus network, said cache memory system comprising:
   a main cache unit including a main directory having a plurality of addressable locations for storing addresses identifying which information words are stored in said main cache unit and for generating signals indicating whether or not information requested by said one processing unit is stored in said cache unit;
   a FIFO buffer circuit coupled to said bus network for storing at least one main memory request for information applied to said bus network;
   a duplicate directory having a plurality of addressable locations for storing a copy of said addresses stored in said main directory, said duplicate directory generating hit signals indicating whether or not said information being requested from main memory by a write request received from said FIFO buffer circuit, is stored in said cache unit;
   a first tie-breaker circuit connected to apply requests for access from said FIFO buffer circuit and said one processing unit to said duplicate directory for updating the status of said addresses during duplicate directory cycles of operation;
   a second tie-breaker circuit connected to apply requests for access from said duplicate directory and from said one processing unit to said main directory during main directory cycles of operation; and,
   timing means coupled to said directories, said tie-breaker circuits and said processing unit, said timing means generating clocking signals for synchronizing the operations of said directories, said cache store and said tie-breaker circuits with said one processing unit, each of said tie-breaker circuits including means responsive to said directory signals for detecting conditions during said directory cycles of operation which could cause cache incoherency, said means generating signals in response to said conditions for causing said directories to perform uninterrupted synchronized directory cycles of operation to maintain cache coherency.

2. The cache memory system of claim 1 wherein said first tie-breaker circuit includes replace request means in response to a FIFO write request and an invalidate request signal from said duplicate directory generated as a result of a signal indicative of a hit in which the address of the information specified by said FIFO request is detected as being stored in said main cache unit corresponding to a first one of said conditions, inhibits access to said duplicate directory by replace requests applied to said first tie-breaker circuit initiated by said one processing unit while simultaneously enabling said duplicate directory to perform an invalidate cycle of operation during which the address producing said hit signal is invalidated.

3. The cache memory system of claim 2 wherein each of said addresses stored in said duplicate directory includes a valid bit and said valid bit is set to a predetermined state of the corresponding address which produced said hit signal during said invalidate cycle of operation.

4. The cache memory system of claim 2 wherein said replace request means is connected to receive a replace request from said main directory, said replace request means generating signals in response to said replace request following completion of said invalidate cycle for enabling said duplicate directory to perform an allocate cycle of operation in which an address contained in a request from said one processing unit which resulted in said cache unit's generation of a miss indicating that the address is not stored in said cache unit, is used to update said duplicate directory.

5. The cache memory system of claim 4 wherein said replace request includes index and tag address bits and wherein said index and tag address bits of said replace request which produced said miss are written into one of said duplicate directory locations during said allocate cycle of operation.

6. The cache memory system of claim 1 wherein said duplicate directory further includes programmable logic circuit means connected to receive signals from said duplicate directory and said first and second tie-breaker circuits, said programmable logic circuit means in response to said signals generating invalidate entry request signals for inhibiting access by said requests initiated by said one processing unit.

7. The cache memory system of claim 6 wherein each said invalidate entry request signal is generated according to the following Boolean equation, wherein the symbols &, ! and # indicate and, inversion and OR operations respectively:

INVENT=(HIT & !BYPASS # INVENT & !INVGNT) &
!CPRSET where "HIT" corresponds to the hit signals generated by said duplicate directory, "BYPASS" indicates a bypass mode of operation and said INVENT signal is held on for a period of time defined by INVENT & !INVGNT where signal "INVENT" indicates the presence of an invalidate signal and signal "INVGNT" indicates that the invalidate request has been previously granted, and wherein signal "!CPRSET" indicates that no reset occurred.

8. The cache memory system of claim 2 wherein said first tie-breaker circuit further includes:
a first clocked bistable circuit which is connected to be set to a predetermined state in response to a FIFO write request only during a first clock interval designated by a first one of said clocking signals, said first bistable circuit being connected to apply an input signal to said replace request means signalling a FIFO cycle of operation; and,
a second clocked bistable circuit which is connected to be set to said predetermined state in response to one of said replace requests during a second clock interval designated by a second one of said clocking signals and to generate a replace granted output signal for signalling that access had been granted to said one processing unit request, said second one of said clock signals being out of phase with said first one of said clocking signals so as to serialize the processing of simultaneously applied requests.

9. The cache memory system of claim 8 wherein said first tie-breaker circuit further includes:
a third clocked bistable circuit connected in series with said second clocked bistable circuit, said third clocked bistable circuit being switched to said predetermined state in response to said replace granted output signal during said first clock interval and generate a replace cycle output signal for signalling a replace cycle of operation; and
output logic circuit means connected to said second and third clocked bistable circuits, said output logic circuit means in response to said replace granted output signal and said replace cycle output signal generating replace select address signal for applying said one processing unit request to said duplicate directory.

10. The cache memory system of claim 1 wherein said second tie-breaker circuit includes invalidate request means responsive to an invalidate request from said duplicate directory as a result of a signal indicative of a miss received from said duplicate directory and a request from said one processing unit generated as a result of a signal from said main directory indicative of a miss corresponding to a second one of said conditions which could cause cache incoherency, to inhibit access to said main directory by said invalidate request while simultaneously enabling said main directory to perform an allocate cycle of operation during which an address of said processing unit is written into one of said main directory locations.

11. The cache memory system of claim 10 wherein each of said addresses stored in said main directory includes a valid bit and said valid bit is set to a predetermined state in the corresponding location into which said address is written during said allocate cycle of operation.

12. The cache memory system of claim 10 wherein said invalidate request means is connected to receive an invalidate request from said duplicate directory, said invalidate request means following completion of said allocate cycle, generating signals in response to said invalidate request for enabling said main directory to perform an invalidate cycle of operation in which said address which resulted in the generation of said invalidate request is used to update said main directory.

13. The cache memory system of claim 12 wherein said invalidate request includes index address bits and a valid bit and wherein said valid bit of said index address bits which produced said hit is set to a predetermined state during said invalidate cycle of operation.

14. The cache memory system of claim 10 wherein said main directory further includes programmable logic circuit means connected to receive signals from said main directory and said first and second tie-breaker circuits, said programmable logic circuit means in response to said signals generating directory replace request signals for inhibiting access by said invalidate requests initiated by said duplicate directory.

15. The cache memory system of claim 14 wherein each said directory replace request signal is generated according to the following Boolean equation, wherein the symbols &, ! and # indicate and, inversion and OR operations respectively:

DIRRPL=(!CPUW-R & MISS & !BYPASS # CPUCYC &
DIRRPL) & !CPRSET) where "CPUW-R" corresponds to a signal generated from said one processing unit indicative of a cache read or write request, "MISS" indicates that a miss condition was detected by said main directory, "!BYPASS" indicates the absence of a bypass mode of operation, and wherein said DIRRPL signal is held on for a period of time defined by DIRRPL & CPUCYC wherein signal "DIRRPL" indicates that a replace operation is being performed and signal "CPUCYC" indicates that a CPU cycle is being performed by said second tie-breaker circuit, and wherein signal "!CPRSET" indicates that no reset occurred.

16. The cache memory system of claim 10 wherein said second tie-breaker circuit further includes:
a first clocked bistable circuit which is connected to be set to a predetermined state in response to a request from said one processing unit only during a first clock interval designated by a first one of said clocking signals, said first bistable circuit being connected to apply an input signal to said replace request means signalling a CPU cycle of operation; and,
a second clocked bistable circuit which is connected to be set to said predetermined state in response to one of said invalidate requests during a second clock interval designated by a second one of said clocking signals and to generate an invalidated granted output signal for signalling that access had been granted to said duplicate directory, said second one of said clock signals being out of phase with said first one of said clocking signals so as to serialize the processing of simultaneously applied requests.

17. The cache memory system of claim 16 wherein said second tie-breaker circuit further includes:
a third clocked bistable circuit connected in series with said second clocked bistable circuit, said third clocked bistable circuit being switched to said predetermined state in response to said invalidate granted output signal during said first clock interval and generate an invalidate cycle output signal for signalling an invalidate cycle of operation; and output logic circuit means connected to said second and third clocked bistable circuits, said output logic circuit means in response to said invalidate granted output signal and said invalidate cycle output signal generating invalidate select address signals for applying said address to said main directory.

18. For use in a data processing system including a main memory shared by a number of processing units including input/output units connected in common to an asynchronous bus network which can assign bus cycles for accessing said shared main memory to different ones of said number of processing units for higher performance, a private write through cache memory system included in one of said number of processing units for providing fast access to main memory information and which is updated in response to each main memory write request issued by said one processing unit, said cache memory system comprising:
a main cache store having a number of addressable locations for storing said main memory information needed by said one processing unit for performing its operations;
a main directory having a plurality of addressable locations for storing addresses identifying which information words are stored in said main cache store, said main directory including address tag compare circuits for generating hit signals indicating when information requested by said one processing unit is stored in said cache store;
a FIFO buffer circuit coupled to said but network for storing main memory requests for information applied to said bus network during each assigned bus cycle of operation;
a duplicate directory having a plurality of addressable locations for storing a copy of said addresses stored in said main directory, said duplicate directory including address tag compare circuits for generating hit signals indicating when said information being requested from main memory by a write request received from said FIFO buffer circuit is stored in said cache store;
a first tie-breaker circuit connected to apply requests received from said FIFO buffer circuit and said one processing unit to said duplicate directory for updating the status of said addresses during duplicate directory cycles of operation;
a second tie-breaker circuit connected to apply requests received from said duplicate directory and from said one processing unit to said main directory during main directory cycles of operation; and,
timing means generating state and clock signals for synchronizing the operations of said directories, said cache store and said tie-breaker with said one processing unit, each of said tie-breaker circuits including means responsive to said hit signals for detecting conditions during predetermined ones of said directory cycles of operation associated therewith which could cause cache incoherency to generate signals for causing said main and duplicate directories to perform uninterrupted synchronized directory cycles of operation to maintain cache coherency.

19. The cache memory system of claim 18 wherein said first tie-breaker circuit includes replace request means in response to a FIFO write request and an invalidate request signal from said duplicate directory generated as a result of a hit signal from said address tag compare circuits indicative of a first one of said conditions, inhibits access to said duplicate directory by replace requests applied to said first tie-breaker circuit initiated by said one processing unit while simultaneously enabling said duplicate directory to perform an invalidate cycle of operation during which the address producing said hit signal is invalidated.

20. The cache memory system of claim 19 wherein each of said addresses stored in said duplicate directory includes a valid bit and said valid bit is set to a predetermined state of the corresponding address which produced said hit signal during said invalidate cycle of operation.

21. The cache memory system of claim 19 wherein said replace request means is connected to receive a replace request from said main directory, said replace request means generating signals in response to said replace request following completion of said invalidate cycle for enabling said duplicate directory to perform an allocate cycle of operation in which an address contained in a request from said one processing unit which did not result in said main directory address tag compare circuits generating said hit signals indicating a miss is used to update said duplicate directory.

22. The cache memory system of claim 21 wherein said replace request includes index and tag address bits and wherein said index and tag address bits of said replace request which produced said miss are written into one of said duplicate directory locations during said allocate cycle of operation.

23. The cache memory system of claim 18 wherein said duplicate directory further includes programmable logic circuit means connected to receive signals from said address tag compare circuits and to said first and second tie-breaker circuits, said programmable logic circuit means in response to said signals generating invalidate entry request signals for inhibiting access by said requests initiated by said one processing unit.

24. The cache memory system of claim 23 wherein each said invalidate entry request signal is generated according to the following Boolean equation, wherein the symbols &, ! and # indicate and, inversion and OR operations respectively:
INVENT=(HIT & !BYPASS # INVENT & !INVGNT) &
!CPRSET where "HIT" corresponds to the hit signals generated by said duplicate directory, "BYPASS" indicates a bypass mode of operation and said INVENT signal is held on for a period of time defined by INVENT & !INVGNT wherein signal "INVENT" indicates the presence of an invalidate signal and signal "INVGNT" indicates that the invalidate request has been previously granted and wherein signal "!CPRSET" indicates that no reset occurred.

25. The cache memory system of claim 19 wherein said first tie-breaker circuit further includes:
 a first clocked bistable circuit which is connected to be set to a predetermined state in response to a FIFO write request only during a first clock interval designated by a first one of said clocking signals, said first bistable circuit being connected to apply an input signal to said replace request means signalling a FIFO cycle of operation; and,
 a second clocked bistable circuit which is connected to be set to said predetermined state in response to one of said replace requests during a second clock interval designated by a second one of said clocking signals and to generate a replace granted output signal for signalling that access had been granted to said CP request, said second one of said clock signals being out of phase with said first one of said clocking signals so as to serialize the processing of simultaneously applied requests.

26. The cache memory system of claim 25 wherein said first tie-breaker circuit further includes:
 a third clocked bistable circuit connected in series with said second clocked bistable circuit, said third clocked bistable circuit being switched to said predetermined state in response to said replace granted output signal during said first clock interval and generate a replace cycle output signal for signalling a replace cycle of operation; and
 output logic circuit means connected to said second and third clocked bistable circuits, said output logic circuit means in response to said replace granted output signal and said replace cycle output signal generating replace select address signal for applying said one processing unit request to said duplicate directory.

27. The cache memory system of claim 18 wherein said second tie-breaker circuit includes invalidate request means in response to an invalidate request from said duplicate directory as a result of a hit signal from said address tag compare circuits and a request from said one processing unit generated as a result of the absence of a hit signal from said main directory address tag compare circuits indicative of a second one of said conditions which could cause cache incoherency, inhibits access to said main directory by said invalidate request while simultaneously enabling said main directory to perform an allocate cycle of operation during which an address of said processing unit is written into one of said main directory locations.

28. The cache memory system of claim 27 wherein each of said addresses stored in said main directory includes a valid bit and said valid bit is set to a predetermined state in the corresponding location into which said address is written during said allocate cycle of operation.

29. The cache memory system of claim 27 wherein said invalidate request means is connected to receive an invalidate request from said duplicate directory, said invalidate request means following completion of said allocate cycle generating signals in response to said invalidate request for enabling said main directory to perform an invalidate cycle of operation in which said address which resulted in the generation of said invalidate request is used to update said main directory.

30. The cache memory system of claim 29 wherein said invalidate request includes index address bits and a valid bit and wherein said valid bit of said index address bits which produced said hit is set to a predetermined state during said invalidate cycle of operation.

31. The cache memory system of claim 18 wherein said main directory further includes programmable logic circuit means connected to receive signals from said address tag compare circuits and said first and second tie-breaker circuits, said programmable logic circuit means in response to said signals generating directory replace request signals for inhibiting access by said invalidate requests initiated by said duplicate directory.

32. The cache memory system of claim 31 wherein each said directory replace request signal is generated according to the following Boolean equation, wherein the symbols &, ! and # indicate and, inversion and OR operations respectively:
 DIRRPL=(!CPUW-R & MISS & !BYPASS # CPU-CYC &
 DIRRPL) & !CPRSET) where "CPUW-R" corresponds to a signal generated from said one processing unit indicative of a cache read or write request, "MISS" indicates that a miss condition was detected by said main directory, "!BYPASS" indicates the absence of a bypass mode of operation, and wherein said DIRRPL signal is held on for a period of time defined by DIRRPL & CPUCYC wherein signal "DIRRPL" indicates that a replace operation is being performed wherein signal "CPUCYC" indicates that a CPU cycle is being performed by said second tie-breaker circuit, and wherein signal "!CPRSET" indicates that no reset occurred.

33. The cache memory system of claim 18 wherein said second tie-breaker circuit further includes:
 a first clocked bistable circuit which is connected to be set to a predetermined state in response to a request from said one processing unit only during a first clock interval designated by a first one of said clocking signals, said first bistable circuit being connected to apply an input signal to said replace request means signalling a CPU cycle of operation; and,
 a second clocked bistable circuit which is connected to be set to said predetermined state in response to one of said invalidate requests during a second clock interval designated by a second one of said clocking signals and to generate an invalidated granted output signal for signalling that access had been granted to said duplicate directory, said second one of said clock signals being out of phase with said first one of said clocking signals so as to serialize the processing of simultaneously applied requests.

34. The cache memory system of claim 33 wherein said second tie-breaker circuit further includes:
 a third clocked bistable circuit connected in series with said second clocked bistable circuit, said third clocked bistable circuit being switched to said predetermined state in response to said invalidate granted output signal during said first clock interval and generate an invalidate cycle output signal for signalling an invalidate cycle of operation; and
 output logic circuit means connected to said second and third clocked bistable circuits, said output logic circuit means in response to said invalidate granted output signal and said invalidate cycle output signal generating invalidate select address signals for applying said address to said main directory.

35. A method of operating a private write through cache memory system included in one of a number of processing units connected in common to a bus network to share a main memory, said cache system providing fast access to main memory information and which is updated in response to each main memory write request issued by said one processing unit, cache memory system having a main cache store having a number of addressable locations for storing said main memory information needed by said one processing unit for performing its operations and a main directory having a plurality of addressable locations for storing addresses identifying which information words are stored in said main cache store, said main directory including address tag compare circuits for generating hit signals indicating when information requested by said one processing unit is stored in said cache store, said method comprising the steps of:

storing in said cache memory system, each main memory request applied to said bus network;

storing a copy of said addresses stored in said main directory in a duplicate directory having a plurality of addressable locations, said duplicate directory generating hit/miss signals by address tag compare circuits for indicating when the information being requested from main memory by a write request received from said bus network is stored in said cache store;

applying through a first tie-breaker circuit requests from said bus and said one processing unit to said duplicate directory for updating the status of said addresses during duplicate directory cycles of operation;

applying requests through a second tie-breaker circuit from said duplicate directory and rom said one processing unit to said main directory during main directory cycles of operation;

generating clock signals by timing means for synchronizing the operations of said directories, said cache store and said first and second tie-breaker circuits with said one processing unit;

detecting conditions by means included in each of said tie-breaker circuits in response to said hit/miss signals during said directory cycles of operation which could cause cache incoherency; and, generating signals for causing said directories to perform uninterrupted synchronized directory cycles of operation in response to said conditions detected in the previous step for maintaining cache coherency.

* * * * *